(12) United States Patent
Prieels

(10) Patent No.: US 12,578,485 B2
(45) Date of Patent: Mar. 17, 2026

(54) RADIATION MEASURING METHOD, APPARATUS AND DEVICE

(71) Applicant: ION BEAM APPLICATIONS SA, Louvain-la-Neuve (BE)

(72) Inventor: Damien Prieels, Louvain-la-Neuve (BE)

(73) Assignee: ION BEAM APPLICATIONS SA, Louvain-la-Neuve (BE)

( * ) Notice: Subject to any disclaimer, the term of this patent is extended or adjusted under 35 U.S.C. 154(b) by 12 days.

(21) Appl. No.: 18/404,098

(22) Filed: Jan. 4, 2024

(65) Prior Publication Data

US 2024/0230927 A1 Jul. 11, 2024

(30) Foreign Application Priority Data

Jan. 6, 2023 (EP) .................................... 23150623

(51) Int. Cl.
*G01T 1/02* (2006.01)
*G21K 5/00* (2006.01)
(52) U.S. Cl.
CPC . *G01T 1/02* (2013.01); *G21K 5/00* (2013.01)
(58) Field of Classification Search
CPC .................................... G01T 1/02; G21K 5/00
See application file for complete search history.

(56) References Cited

U.S. PATENT DOCUMENTS

| | | | |
|---|---|---|---|
| 5,880,477 A | 3/1999 | Perilleux et al. | |
| 6,617,596 B1 | 9/2003 | Korenev | |
| 7,187,752 B2 | 3/2007 | Kotler et al. | |
| 8,401,148 B2 * | 3/2013 | Lu ........................ | A61N 5/1031 378/65 |

FOREIGN PATENT DOCUMENTS

| | | | | |
|---|---|---|---|---|
| DE | 102019109210 A1 * | 10/2020 | ............. | A61L 2/082 |
| DE | 102018010615 B4 * | 1/2025 | ............. | A61B 6/586 |

OTHER PUBLICATIONS

European Search Report for counterpart European Application No. EP23150623.9, dated Feb. 11, 2023, 9 pages.

* cited by examiner

*Primary Examiner* — David P Porta
*Assistant Examiner* — Fani Polyzos Boosalis
(74) *Attorney, Agent, or Firm* — FINNEGAN, HENDERSON, FARABOW, GARRETT & DUNNER LLP

(57) ABSTRACT

The present disclosure discloses a method for measuring and checking the irradiation of a product by a radiation source using a measuring device. After conveying the product in front of the radiation source, the radiation beam irradiates the front of the product and passes through to hit the at least two detectors, which are pointing to the same target zone of the radiation source by a collimator. Finally, the recorded signal of each detector is compared with the signals determined in the performance qualification.

16 Claims, 19 Drawing Sheets

RADIATION MEASURING METHOD, APPARATUS AND DEVICE

REFERENCE TO RELATED PATENT APPLICATION

This application claims priority to European Patent Application No. 23150623.9 filed on Jan. 6, 2023, which is hereby incorporated by reference in its entirety.

TECHNICAL FIELD

The present disclosure relates to the field of the irradiation of products and, more particularly, to a method and an apparatus for checking, possibly in real-time, that the required radiation satisfies the dose requirement.

BACKGROUND

Sterilization techniques using radiation are well-known in the art. However, for the treatment of large volumes such as pallets full of medical devices, pharmaceutical products, cosmetics, or any other materials, x-ray radiation is the most appropriate in view of better penetration of x-rays in-depth with high speed and efficient, targeted processing that facilitates scale from small size product to full pallets of products.

Irradiating a product with high energy radiation in sufficient doses damages and kills living organisms or cells, such as parasitic bacteria and viruses, responsible for the product's contamination.

Knowing the dose of radiation deposited in an irradiated product is essential to determine if it is correctly irradiated and confirm that there is no under or over-irradiation compared to a planned irradiation plan. However, to guarantee that a product receives the appropriate dose, standard practices consist of performing several calibrations and verifications, which are time-consuming, subject to error and incomplete as they consist in verifying the dose in one single point of the pallet.

Being able to detect in real-time an irradiation problem from the signal of detectors is very interesting. However, it is also essential to distinguish whether the problem comes from the product itself or the irradiation system to address it instantly and efficiently. Collecting signal data of a detector placed behind the product will not provide this distinguishing. Moreover, placing a detector in front of the product to be irradiated allows for analyzing the beam emerging from the irradiation system. It may be useful to detect problems with the irradiation system. However, this solution comes with many disadvantages, like the necessity to increase the distance between the x-ray converter and the conveyor, which will decrease energy efficiency. Additionally, placing a detector directly behind the x-ray converter may lead to its rapid saturation and temperature rise, decreasing its sensitivity and requiring heavier cooling systems. Consequently, using detectors, upfront and behind the product, that are not used in the same conditions may lead to signal errors.

The present disclosure provides a new and improved device and method for checking, possibly in real-time, the irradiation dose on a product. In addition, the present disclosure presents a new device and method that overcomes the above problems and can detect distinctly if the problem originated from the product or from the irradiation system during irradiation.

SUMMARY

The present disclosure relates to a radiation measuring method, apparatus and device as described in the appended claims The present disclosure relates to a method for checking the radiation dose received by a product by a radiation source comprising the following steps, measuring at least a reference signal $S_{dn,PQ}(t)$ of the radiation dose by at least one detector of a series of at least two detectors during a performance qualification step received by a reference product, said series of at least two detectors comprising each a detecting part and a collimator placed at a predetermined distance from the radiation source in such a way that the said at least two detectors are arranged in a plane facing a converter generating the irradiation beam and pointing to a same target zone of the radiation source that is interrupted partially or fully by at least a portion of the product, conveying the product in front of the radiation source so that at least a portion of a front surface of the product is irradiated with an irradiation beam produced from said radiation source, measuring a signal $S_{dn,Process}(t)$ of the radiation dose received by said product by each detector of the series of the least two detectors, and comparing each measured signal of the at least two detectors of the same series with the at least reference signal measured by the at least one detector of the same series by a controller.

According to one embodiment, the method comprises a comparison of at least two ratios $$\frac{S_{dn,Process}(t)}{S_{dn,PQ}(t)}$$

of the at least two detectors of the same series to determine whether the error is coming from the product or the radiation source. Wherein if a similar deviation between the at least two ratios $$\frac{S_{dn,Process}(t)}{S_{dn,PQ}(t)}$$

of the at least two detectors of the same series is detected, the error is likely coming from the radiation source. Contrarily, the error may have originated from the product if this deviation is different.

In another embodiment, at least one reference signal $S_{dn,PQ}(t)$ is measured by each detectors of the same series.

The present disclosure relates to an apparatus for the irradiation of a product using the described method comprising;

a radiation source to provide radiation beams that pass through at least a portion of a front surface of the irradiated product, a series of at least two detectors comprising each a detecting part and a collimator placed at a predetermined distance from the radiation source in such a way that the at least two detectors are arranged in a plane facing the radiation source and pointing to a same target zone of the radiation source that is interrupted partially or fully by at least a portion of the product, a controller to make comparison between the at least signal recorded from one of the at least two detectors during the performance qualification $S_{dn,PQ}(t)$ and signals recorded from the same at least two detectors during the irradiation of the product $S_{dn,Process}(t)$, and a conveying device which conveys the product in front of the radiation source and between said radiation source and the series of the at least two detectors.

The present disclosure relates to a measuring device for measuring a radiation dose of a radiation beam used for the described method or apparatus comprising a series of at least two detectors comprising each;

a detecting part which is equipped with an ionization chamber, preferably a double ionization chamber, a collimator covering partially or fully the detecting part intended to narrow the reception of a beam, an electrometer used to capture and read a radiation dose in real-time at a frequency between 0.1 Hz and 10 KHz, preferably around 1 Hz, wherein the collimator of one of the at least two detectors is pointing to a same target area of a beam of another collimator of another detector of the at least two detectors.

Other aspects, objectives and advantages of the present disclosure will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present disclosure and, together with the description, serve to explain the principles of the present disclosure. In the drawings.

While the present disclosure will be described in connection with certain preferred embodiments, there is no intent to limit it to those embodiments. On the contrary, the intent is to cover all alternatives, modifications and equivalents as included within the spirit and scope of the present disclosure as defined by the appended claims.

DETAILED DESCRIPTION

Figure 1:
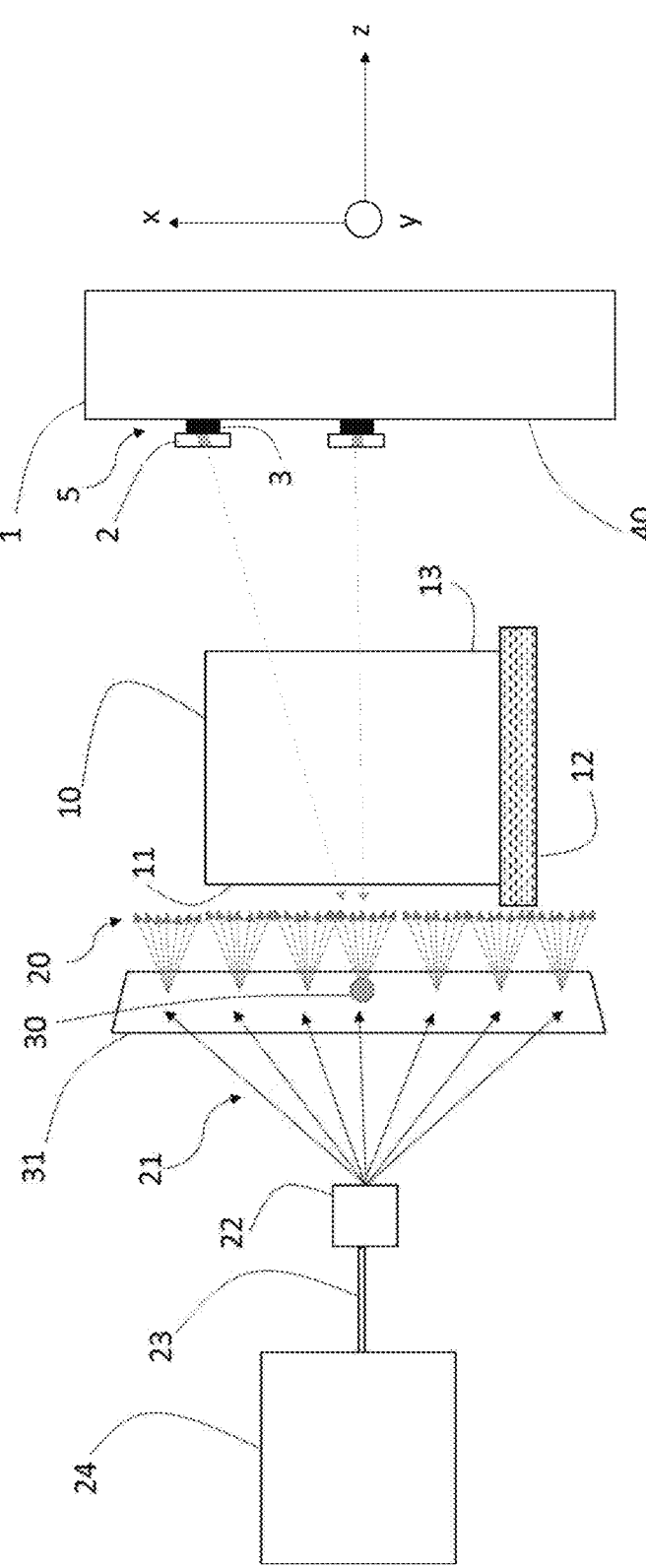
FIG. 1 is a front view of an apparatus for the irradiation of products including a measuring device for measuring a radiation beam with one series of at least two detectors.

FIG. 1 illustrates a general illustrative view of an irradiation system or apparatus used to irradiate products by x-ray. The first part is related to the generation and emission of the x-ray beam via a converter 31. The second part is composed of a conveyor system 12 to ensure the passage of the product in front of the irradiation system to be irradiated through the beam leading to its sterilization in one or more passageways.

X-ray starts as an electron beam where electrons are generated and accelerated with an electron accelerator or particle accelerator 24. Next, a high-energy electron beam passes through a foil made of high atomic number metal named converter 31 to convert electrons to X-rays via Bremsstrahlung. Electron beams are usually scanned up and down in a scan horn before reaching the metal foil so that the resulting x-rays are emitted over the entire target height.

By the term "accelerator" it is meant an apparatus or a source capable of providing high-energy electrons, preferably with energy measured in millions of electron volts (MeV) and power measured in kilowatts (kW). It is obvious to a skilled person in the art that the accelerator 24 comprises auxiliary equipment such as but not limited to scanning magnet 22, target, flanges, power supply, power modulator, cooling system, generators, linear-beam vacuum tube 23, and many other components.

By the term "scanning horn" or simply referred to as "horn", it is meant a device designed to scan a beam of high energy electrons over a specified angular range before reaching the metal foil so that the resulting x-ray or any other type of radiation are emitted over the entire target height. More than one horn with the same or different dimensions may be used in the system.

By the term "performance qualification", it is meant a routine processing in radiation apparatus or facilities that process products with high energy electrons or x-rays to ensure that the product can be treated within a predetermined range of absorbed doses. The performance qualification helps to determine the magnitude and distribution of absorbed dose in a product by dose mapping that is required in conjunction with some other stages of a radiation sterilization process. It uses a specific product, usually a reference product with the same characteristics and properties as the product to be irradiated, to demonstrate that the irradiation apparatus consistently operates following predetermined criteria to deliver the defined specified dose, thereby resulting in a product that meets the specified requirements. Hence, the performance qualification establishes all the process parameters that satisfy absorbed dose requirements. The distribution of absorbed dose in the product is determined by the interaction of the radiation with the product and this, in turn, depends on the type and energy of the radiation and whether it is delivered in one pass or multiple passes. The primary purpose of performance qualification dose mapping is to determine the relationships between the minimum dose and the maximum dose in the irradiated reference product, as well as their relationships with the dose at the routine monitoring location. In other words, the performance qualification dose mapping is carried out to demonstrate that product can be irradiated to doses required for the intended effect and the maximum acceptable dose. The performance qualification should consider the inhomogeneity of the product as the local density inside the product is not constant and/or continuous through its depth. Lab measurements and verification on the irradiated product may be performed to verify and validate the minimum and maximum dose and use them as a threshold for the irradiation process.

The product used in the performance qualification may be called as a reference product which has the same properties, characteristics, features, and structure as the product 10. More than one reference product, preferably more than three, may be used for checking the reproducibility of the measurements.

During or after the performance qualification, the radiation parameters are validated and set in the radiation apparatus. The detectors 5 are positioned to perform measurements on several products 10 (same or different) to confirm the reproducibility of the results. These recorded data represent a first estimate of the obtainable dose measurement reproducibility in a dose map exercise and are taken as reference data or signal $S_{dn,PQ}(t)$ for each condition and/or each product 10 to be compared later during the radiation process. However, the reference signal $S_{dn,PQ}(t)$ may also be taken during the performance qualification step. Defining the reference signal $S_{dn,PQ}(t)$ is not limited by the performance qualification step. Some measurements and data can be derived and captured during the performance qualification when irradiating different radiation doses on different reference products so that the reference signal is interpreted linearly or by other models. Moreover, theoretical calculations or simulations via dedicated software may also be employed to determine the reference signal $S_{dn,PQ}(t)$.

Irradiating or radiating product 10 means exposing it to a radiation source 20. The product or pallet 10 should be placed partially or wholly in front of the radiation source 20 to irradiate at least a portion of the product 10.

The irradiation may be executed in one go or in steps by exposing a façade or multiple facades of the product 10 to the radiation source 20.

It is to be understood that the product 10 can mean any object or any pack of objects, identical or different. Additionally, the product 10 is not limited to any material, type, size, or shape.

The combination of shorter exposure time and improved dose uniformity ratio makes the sterilization, as well as other applications by x-ray, a viable processing option for a variety of products.

X-ray radiation produces electron disruptions in any material that it encounters. More precisely, when these electrons encounter the DNA or other cellular structures of living cells, they will damage and kill them, resulting in the organism's death or rendering it incapable of reproduction. Therefore, this technique is convenient in reducing significantly any living contaminants which may be present in the package of the product 10, in its environment or in the product 10 itself.

Providing an irradiation dose with high precision requires continuous audits, calibrations, and verifications. Therefore, it is crucial to irradiate a dose that is sufficient to ensure the minimum required dose to thoroughly sterilize the full pallet or the product 10 and not to exceed the maximum dose to avoid any deterioration of the product.

The present disclosure applies to sterilizing various products such as medical devices, pharmaceutical products, cosmetics, raw materials, animal feed, and packaging materials and to other applications like materials treatment or polymer modification. Moreover, the dosimetry device or the measuring device is not limited to dose X-ray irradiation; it may also be used to dose other types of irradiations such as gamma or E-beam.

Referring again to FIG. 1, an electron accelerator 24 is employed to cause high-velocity electrons to collide with the converter 31, which may be a metal foil with a high atomic number conversion plate such as but not limited to tantalum or tungsten that results in the emission of x-rays. The electron accelerator 24 may also emit high-velocity electrons directly for irradiation.

The irradiated electrons' energy is selected depending on the product's dimensions and density, and it is usually defined at the moment of the installation and settlement of the irradiation process. The countries' regulations and the product type may also limit the use of a specific range of energy. In the embodiment of the present disclosure, an energy between 1 MeV and 10 MeV may be produced.

Suppose the surface of product 10 is facing the convertor 31 and being irradiated by the irradiation source 20 is considered a front surface 11. In that case, the back surface 13 is the surface from where the irradiation beam is coming out to irradiate the wall or the plane 40. Therefore, any object located in the zone between the back surface 13 and the wall or plane 40 is considered as positioned behind the product 10.

Referring again to FIG. 1, there is a series 1 comprised of two detectors 5 placed behind the product 10 and at a fixed distance from the converter 31. The distance between series 1 is predetermined before the irradiation process, which may depend on the product's size 10 and/or the energy of the electrons. The series 1 of detectors may comprise at least two detectors 5 arranged in the same plane 40, which may be a wall existing behind the product 10 to measure the dose of radiation transmitted through the product or the pallet 10. More than one series 1 comprising at least two detectors 5 may also be placed in the same plane 40 or in another plane. In the case of more than one plane 40, the same conditions may apply. More precisely, the plane(s) 40 is/are facing the converter 31 and standing behind the product 10, leaving the predetermined and fixed distance to allow the conveying of product 10. Preferably, the plane 40 is parallel to converter 31. Nevertheless, plane 40, comprising the detectors 5 may be placed in different locations around the product 10 so that the radiation passes through the product and can be recorded and collected by the detectors 5.

The current of the irradiated electrons may be synchronized with the speed of the conveyor 12 to irradiate the product 10 with the appropriate dose. Therefore, the speed of the conveyor 12 may be used as well as the beam's current, the beamline optics or the x-ray conversion target to adjust the irradiation dose. Also, the surrounding of the product, for example, the neighboring pallets, the pallet support, and the conveyor 12, may affect the radiation dose.

The beam energy, the beam current, and the beamline optics, including the scanning amplitude and the pseudo/quadrupoles, the x-ray conversion target, the product's travel speed, the pallet's content, and the surroundings, determine the irradiation dose. The first four parameters directly influence the x-ray emission, such as the energy spectrum, the phase space, and the production rate. In order to guarantee that the product 10 receives the appropriate dose, standard practices consist in performing several calibrations and verification such as the operational qualification, performance qualification, routine dose checks, and monitoring some or all the mentioned parameters. However, these practices are time-consuming, subject to errors and incomplete. For example, these routine checks consist in verifying the dose in one single point of the pallet or the product 10. Therefore, monitoring the beam beyond the scan horn is desirable.

Because of the many parameters that may affect the radiation dose, it is necessary to ensure a good balance between under-irradiating the product 10, which may lead to an unsterilized product and over-irradiation, which may lead to a deteriorated product or other undesirable results. However, checking every product or pallet 10 is, first time consuming and, second, destructive. Therefore, checking the dose in-real time is highly preferred.

In one embodiment, X-ray radiation is preferred as radiation. However, other radiation, such as but not limited to electron beams or gamma rays, may be used. Additionally, more than one source of radiation, identical or different, may be employed.

In order to control the irradiation dose in real-time, a measuring device for measuring a radiation dose of the radiation source 20 captures and measures the radiation to send the signal to the electrometer 6. Preferably, the measuring device is equipped with a series 1 of at least two detectors 5. However, more than two detectors 5 may also be installed. It is essential that the radiation source 20 is captured from the same target zone 30 existing near converter 31. It is also essential that the captured beams are crossing the product 10 to allow the distinction if the error is coming from product 10 or the radiation source 20. The measurements taken from the gap between the passage of two products 10 can be considered a reference measurement of the radiation source 20. In other words, when there is no interruption of the radiation beam, the detectors 5 capture and measure the beam of the radiation source 20 without direct interferences by the product 10. Suppose there is a deviation between detectors 5 of series 1. In that case, the deviation is expected to be similar at all the detectors 5.

There can be as many detectors bundled to one series 1. In other words, each series 1 comprises at least two detectors 5; however, there is no limitation on the number of detectors 5 of each series 1. Preferably, each series 1 is directed to the source of irradiation 20. More precisely, each series 1 point to the same target zone 30 of the radiation source 20. The series 1 may be positioned in a plane 40 facing the radiation source 20 and preferably parallel to the converter 31. The plane 40, comprising the series 1 of the detectors 5 and the plane comprising the converter 31, may be placed vertically, horizontally, or inclined.

Figure 2:
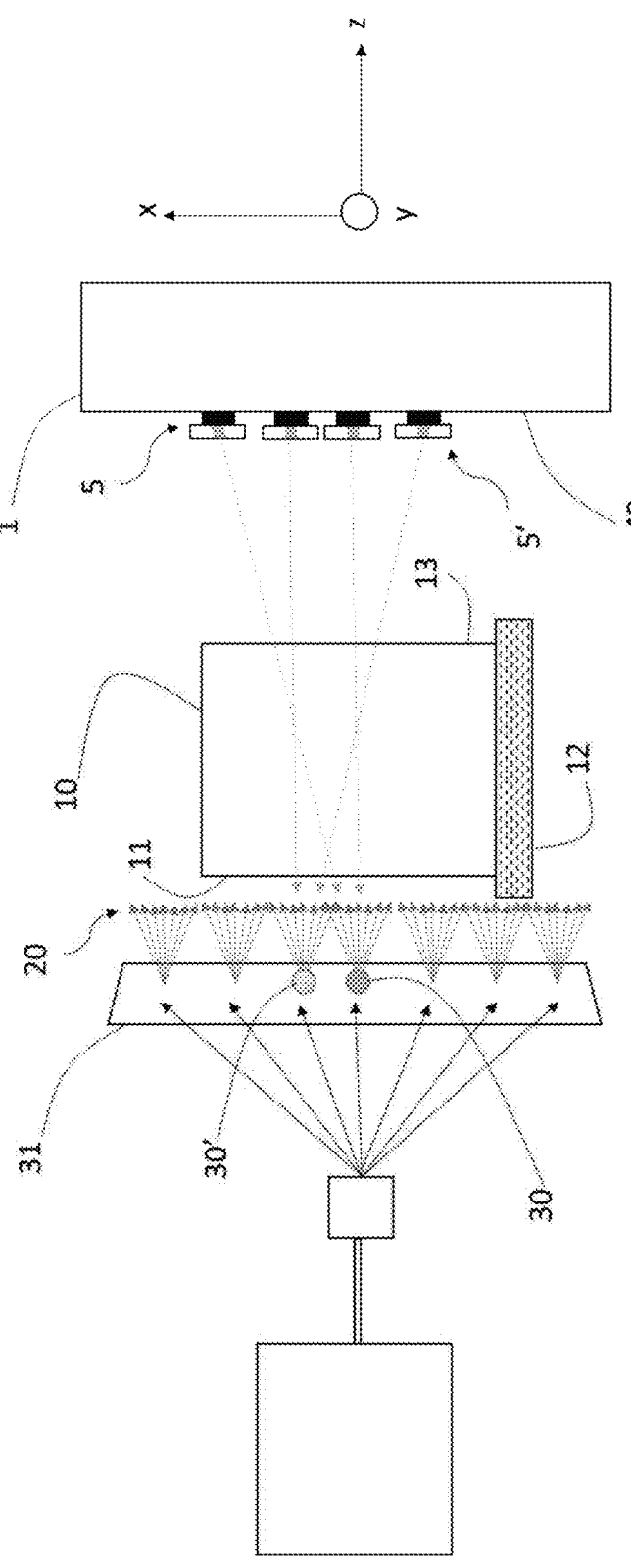
FIG. 2 is a front view of an apparatus for the irradiation of products including a measuring device for measuring a radiation beam with two series of at least two detectors each.

FIG. 2 illustrates another embodiment where more than one series 1 of the at least two detectors 5 are used. The embodiment consists in placing several couples of detectors 5. Each pair of detectors 5 may point on a specific point of the target zone 30 and may have a specific (x,y) position to intercept a specific portion of the product 10 being irradiated.

Figure 8A:
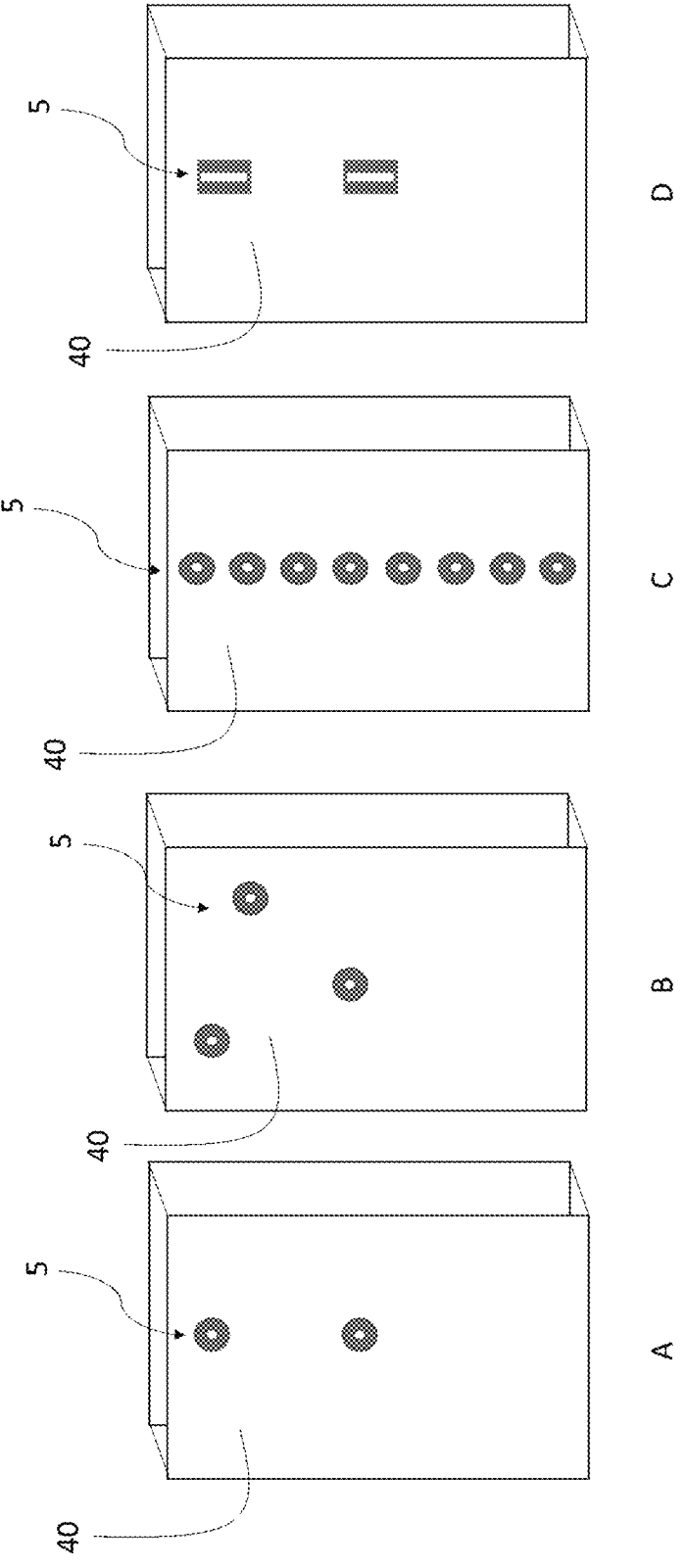
FIG. 8a is a perspective view of the wall where multiple detectors are positioned.

FIG. 2 illustrates an irradiation system composed of a scanning system with a height between 1 m and 10 m, preferably around 2 m, to treat a pallet 10 of a height of about 1.6 m. Other pallet heights might be treated thanks to the conveyor 12 that allows the movement of the pallet 10 horizontally as well as vertically. The conveyor 12 may also perform rotational movements when the product 10 is placed in front of the radiation source 20 to radiate the product 10 from more than one side. The front wall 40 may comprise the measuring device that contains a vertical array of air-filled ion chambers 3 (FIG. 8a.C and D). The number of air-filled ion chambers 3 may be between 2 and 1000, preferably between 4 and 64, and more preferably 32. The plane 40 is spaced from the horn exit window by a distance between 0.5 m and 10 m, preferably between 1 m and 5 m, and more preferably between 1.5 m and 2.5 m, allowing the passage of at least a portion of the pallet 10, preferably the entire pallet 10. The wall 40 may be parallel to the plane comprising the x-ray converter 31.

As shown in FIG. 2, the array of the detectors 5 faces the radiation source 20 and, therefore, the converter 31. The exit zone of the converter 31 comprises the target zone 30, where at least two of the detectors 5 are oriented to read and capture the radiation source 20. More than two detectors 5 may also be oriented to the same target zone 30. Also, more than one target zone 30 may be targeted by the same series 1 of at least two detectors 5 or each target zone 30 by a series 1 of at least two detectors 5. Measuring the irradiation dose coming from more than one target zone 30 and by more than one detector 5 helps to verify if a deviation error is caused by damage of one or both of the detectors 5. This may also play as a reserve series 1 of detectors 5 to dispense the need for maintenance which might lead to a temporary slowdown of the irradiation process. The same applies to a series 1 of more than two detectors 5. In the illustrated embodiment of FIG. 2, two series 1 of two detectors 5 are mounted on the wall 40. Each detector 5 is focused on the concerned target zone 30 via a collimator 2.

By the term "collimator", it is meant a device through which an emitted or received radiation passes to narrow it, widen it, or shape it into a desired direction or geometry. The collimator 2 may have different profiles, but not limited to a shallow or elongated internal profile. These profiles may be parallel, inclined with an acute or obtuse angle. In other words, the collimator 2 helps to focus the reception or emission of the radiation beam into a precise location. The collimator 2 can be manually or automatically adjustable.

The detectors 5 may be used to determine specific parameters before the radiation of product 10 to allow some calibrations or to register some reference measurements to be considered for later comparisons.

The detectors 5 may be equipped with an electrometer 6 used to read the radiation dose and other parameters at a frequency between 0.1 Hz and 10 kHz, preferably 1 Hz, permitting the readings in real-time and during the irradiation of the product 10. The readings may be combined with other parameters such as but not limited to product density, conveying speed, dimensions, energy and power of the electron beam, and many other parameters to adjust, calculate, or control any change.

Figure 3:
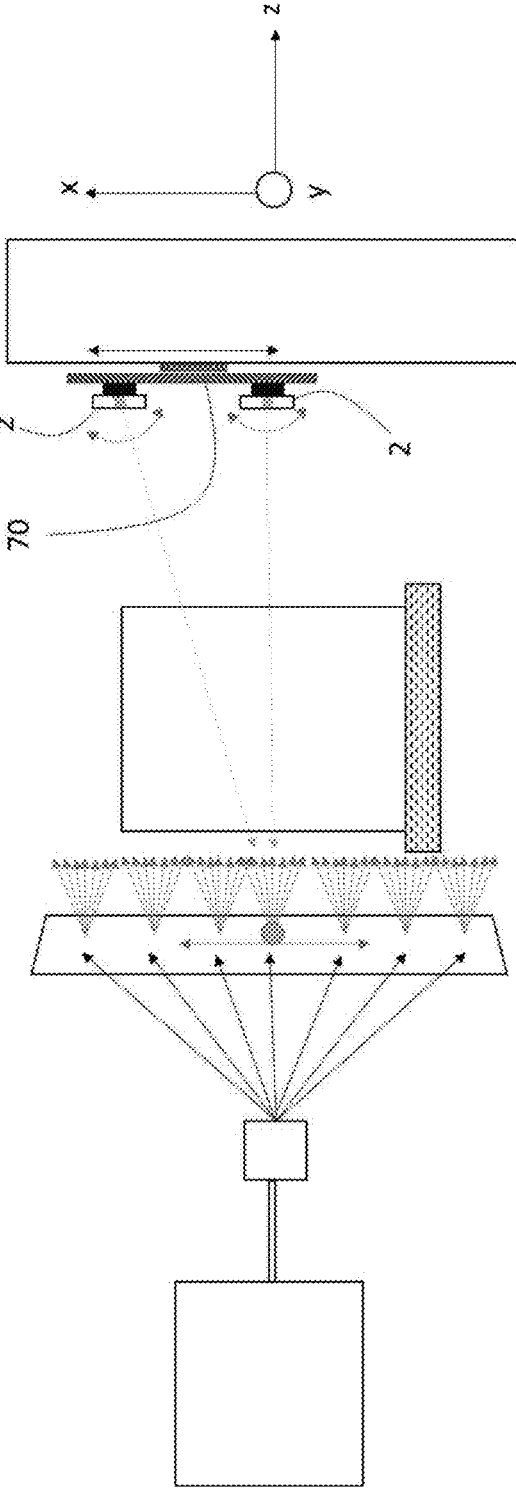
FIG. 3 is a front view of an apparatus for the irradiation of products including a measuring device for measuring a radiation beam with one movable series of at least two detectors.

FIG. 3 is another embodiment comprising a series 1 of a pair of detectors 5 composed each of a pivotable collimator 2. Additionally, the detectors 5 may be mounted in a mobile support 70 that may have 3 degrees of freedom but preferably 2 degrees of freedom in the x and y directions. The mobile support 70 may be moved manually or automatically such that the position of the detectors 5 can be changed in synchronization with the collimator 2 of each detector 5 to reach more than one target zone 30 and/or another portion of the product 10. This may be advantageous to detect, for example, an error on the scan offset, an error on the x-ray converter 31 at a different target zone 30, or an error at another point of the product 10.

Referring again to FIG. 3, the collimators 2 may have a pivotable or rotatable movement that may be synchronized with any movement of the series 1 or the mobile support 70 to assure a precise pointing and, therefore, detection of a radiation source 20 originating from a predefined target zone 30. Similar to the mobile support 70, the movement of the collimators 2 may be controlled manually or automatically.

Although FIGS. 1, 2 and 3 illustrates horizontal irradiation, it is also possible to irradiate the product 10 vertically or in any inclination.

Another embodiment consists in using collimators 2 that have a specific opening such that the detector assembly does not point at a single point of the target zone 30 but covers a segment of the target. As a result, detectors 5 equipped with such collimators 2 may detect a larger amount of x-rays or radiation source 20. Advantageously, the error due to the sensitivity of pointing a precise point related to the radiation source 20 or the product 10 may reduce significantly. Additionally, several detectors 5 may be needed as a larger area of the target zone 30 may be covered.

The target zone 30 may be defined as a region, area, or point with a dimension of about 10 cm$^2$, preferably of about 1 cm$^2$, and more preferably a point. The smaller the target zone 30, the more precise the signals of the at least two detectors 5 will be, and the fewer deviation noises will obtain. The target zone 30 may be oriented by more than two detectors 5 from the same series 1 as well as by more than one series 1. More than one target zone 30 may also be used.

Figure 4:
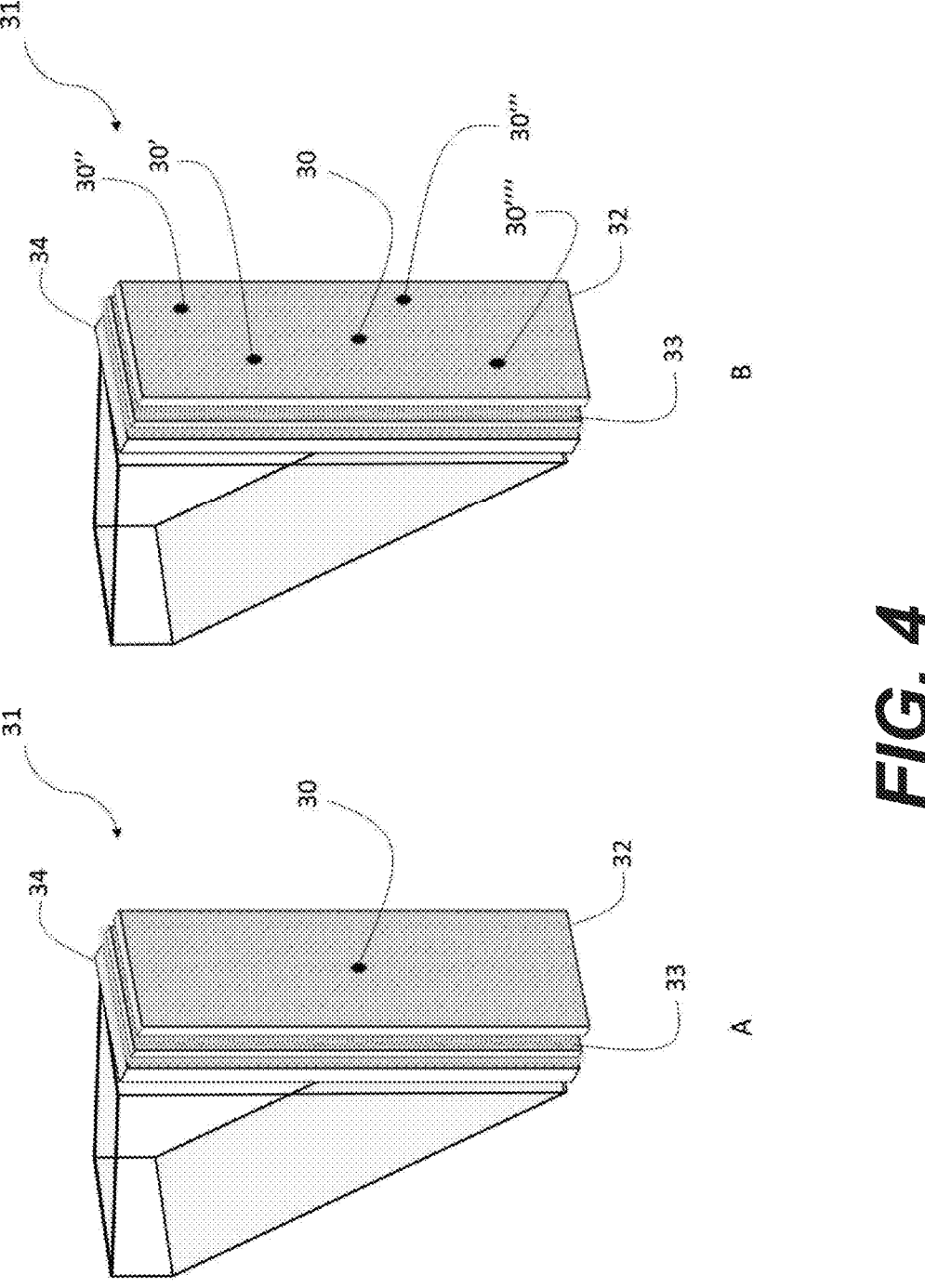
FIG. 4 is a perspective view of the converter showing the location of one or more target zones.

FIG. 4A illustrates in perspective the converter 31, where the target zone 30 is highlighted. To obtain the required x-ray, a multi-layered structure made mainly of tantalum sheet 34, water layer 33, and stainless steel sheet 32 is considered. The tantalum sheet 31 may also be replaced by a tungsten sheet or other high atomic number material that can generate the bremsstrahlung radiation from incident electron beam. The water layer 33 is used to remove the heat deposited on the tantalum sheet 31, while the stainless steel sheet 32 is used to mainly stop the unwanted electron contamination coming out with the bremsstrahlung radiation. The target zone 30 may be located in any place or area on the surface of the stainless steel sheet 32. In case of a replacement of the stainless steel sheet 32 by any other layer or sheet or in case other layers are added to the converter 31 for any reason, the target zone 30 should be placed on the surface of the outer layer of the converter 31. FIG. 4B illustrates several target zones 30, 30', 30", 30''', and 30''''. There is no limitation on the number of the target zone 30, and each target zone 30 may be targeted or pointed by one or more detectors 5, preferably by at least two detectors 5 of the same series 1.

In one embodiment of the method, the following procedure is used to measure and control the radiation source 20 used to irradiate product 10.

To define the required parameters for the minimum and maximum dose needed to irradiate the product 10 appropriately, a performance qualification step followed optionally by a calibration step is performed on a reference product having the same properties, characteristics, features, and structure as the product 10. During or after one or both of these steps, each detector's reference dose and/or signal $S_{dn,PQ}(t)$ are/is registered in the controller 80.

The product 10, in this embodiment, pallet 10, is loaded and conveyed with a controlled speed in front of the radiation source 20. At least a position of the front surface 11 of the product 10 is exposed in front of the radiation source 20, for example, x-ray or gamma rays, to be irradiated. The conveyor speed may vary from 0.1 m/min to 100 m/min, ideally from 0.5 m/min to 10 m/min, and preferably around 3 m/min. The conveying speed is calculated and defined in the qualification procedure based on the required irradiation dose for product 10.

The radiation from the source 20 is emitted toward the front surface 11 and propagates through the depth of the product 10 to be detected partially by the detector 5 of the series 1 via the collimator 2. The collimators 2 of each detector 5 are crucial to narrow the reception of the beam from the radiation source 20. Thanks to the collimators 2, at least two detectors 5 of each series 1 receive beams from the same radiation source 20 and from the same target zone 30. The series 1 comprises at least two detectors 5 fixed on a plane 40 opposite the converter 31. More than one series 1 may be used in the same plane 40 or in another plane fronting the conveyor 12 and able to receive beams originating from the irradiation source 20 and irradiating partially or fully the product 10. The detector 5 positioned on plane 40 needs to be spaced from the converter 31 to allow the product 10 to convey partially or fully in front of the radiation source 20.

The signals of each detector 5 are detected by an ionization chamber, preferably a double ionization chamber and read by an electrometer 6 in real-time at a frequency between 0.1 Hz and 10 KHz, preferably around 1 Hz. These signals $S_{dn,Process}(t)$ are received by a controller 80 to be compared with the signals recorded from the same detectors 5 in the performance qualification procedure $S_{dn,PQ}(t)$. In more detail, the controller 80 may record for each detector 5 a ratio $$\left( \text{i.e. } \frac{S_{d1,Process}(t)}{S_{d1,PQ}(t)} \text{ and } \frac{S_{d2,Process}(t)}{S_{d2,PQ}(t)} \right)$$

between the signal determined during or after the performance qualification of the product 10 and the signal of the same detector 5 during the irradiation of the product 10. If the irradiation process runs without errors, the ratio of the two said signals should equal 1. However, when the ratio diverges from 1, it indicates an error in one of the parameters, and/or the product, and/or the components of the irradiation apparatus. Thanks to series 1, which comprises more than one detector 5 pointing to the same target zone 30 of the radiation source 20, comparing the deviation of each said detector 5, may guide defining whether the error originated from the radiation source 20 or product 10. In more detail, if this deviation is similar for all detectors 5, it is more probable that radiation source 20 is responsible for this error. It is then recommended to check parameters such as but not limited to beam current, beam energy, converter 31, scanning speed, and beam scanning amplitude. Conversely, when the deviation is unalike, it is most probable that the error originated, for example, from a wrong product 10, improper packaging or wrong product 10 positioning. Some calibration practices and factors, such as the effect of temperature increase due to the irradiation beam hitting the detectors 5, might be required or need to be considered to attain a reliable comparison with minimum disturbance.

Figure 5:
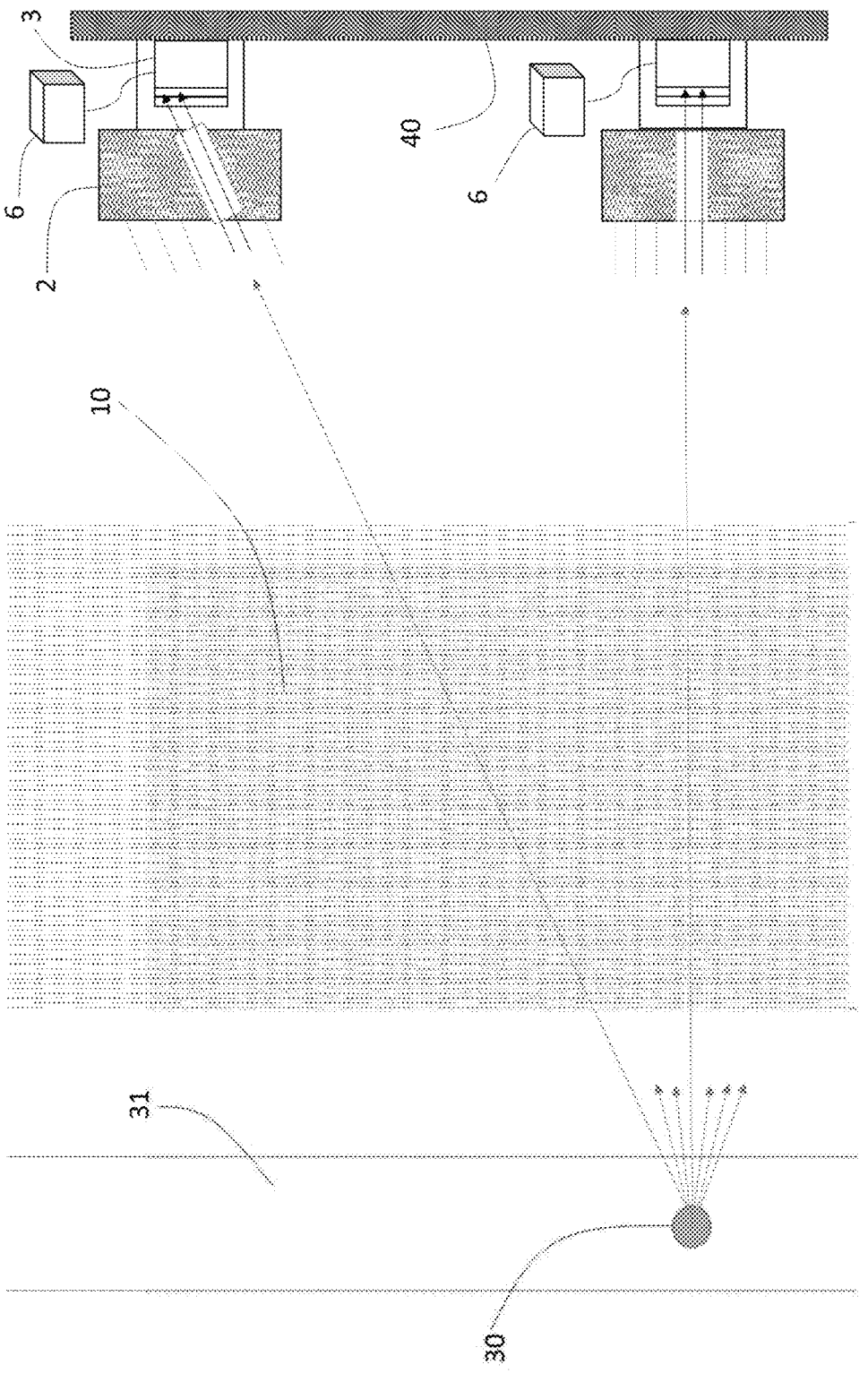
FIG. 5 is a zoom-in of the series of at least two detectors pointing via collimators to the same target zone of the radiation source.

With reference to FIG. 5, the detecting part 3 is connected to an electrometer 6 to receive and measure the collected current from the ionization chamber in real-time.

A setup step is followed to adjust the position and align the direction of the collimators 2 of the at least two detectors 5. In more detail, as the collimators 2 may be positioned in different 3-axis coordinates (x,y,z) behind the product 10 (FIGS. 8*a* and 8*b*), they are adjusted and calibrated to point and receive beams irradiated from the same target zone 30. The at least two collimators 2, from the same series 1 allow the irradiation beams that originate from the target zone 30 to irradiate the product 10 and allow their passage through a hole or a gap to reach the detecting part 3.

Figure 6:
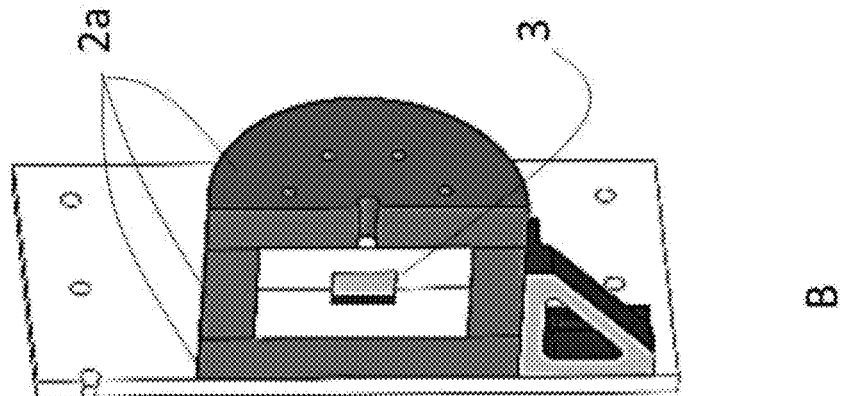
FIG. 6 is a perspective view (A) and a cross-sectional view (B) of the collimator covering the detector and installed on the wall.
Figure 6:
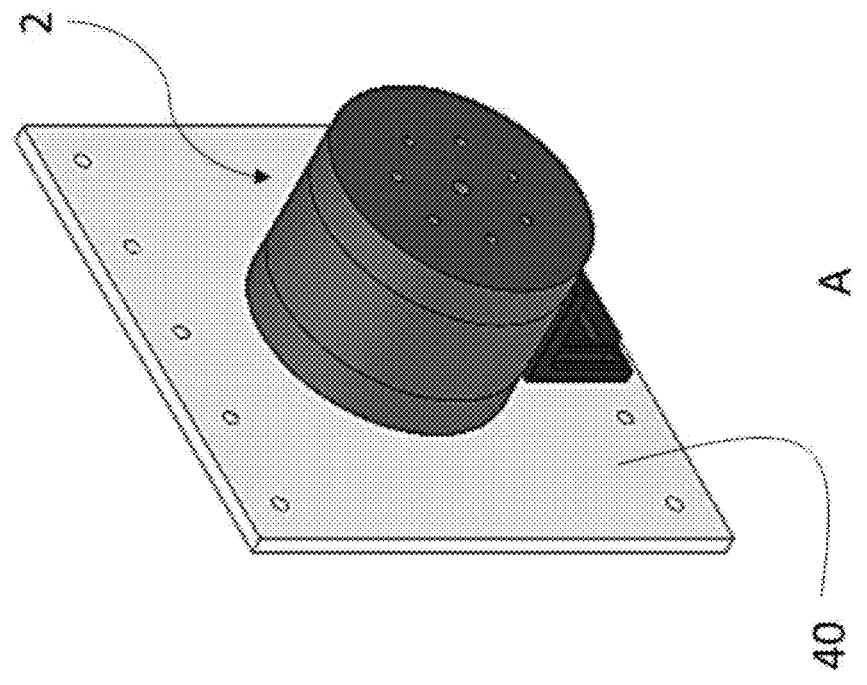

An example of a collimator 2 covering one detecting part 3 is illustrated in FIG. 6. The collimator 2 is responsible for narrowing the received beam to allow primarily a specific portion of the beam coming from the target zone 30 that passes through the product 10. The center hole of the collimator 2 may vary from 50 mm to 0.5 mm, preferably from 20 mm to 1 mm, but more preferably around 3 mm. A smaller collimator hole may reduce the signal intensity, reduce the impact of scattered photons and therefore, better precision. The collimator 2 may comprise housing parts 2*a* that house the detecting part 3, which may be an ionization chamber or a double ionization chamber. The housing parts 2*a* also protect the detecting part 3 from total exposure to the irradiation to mitigate its degradation and/or high-temperature increase.

Figure 7:
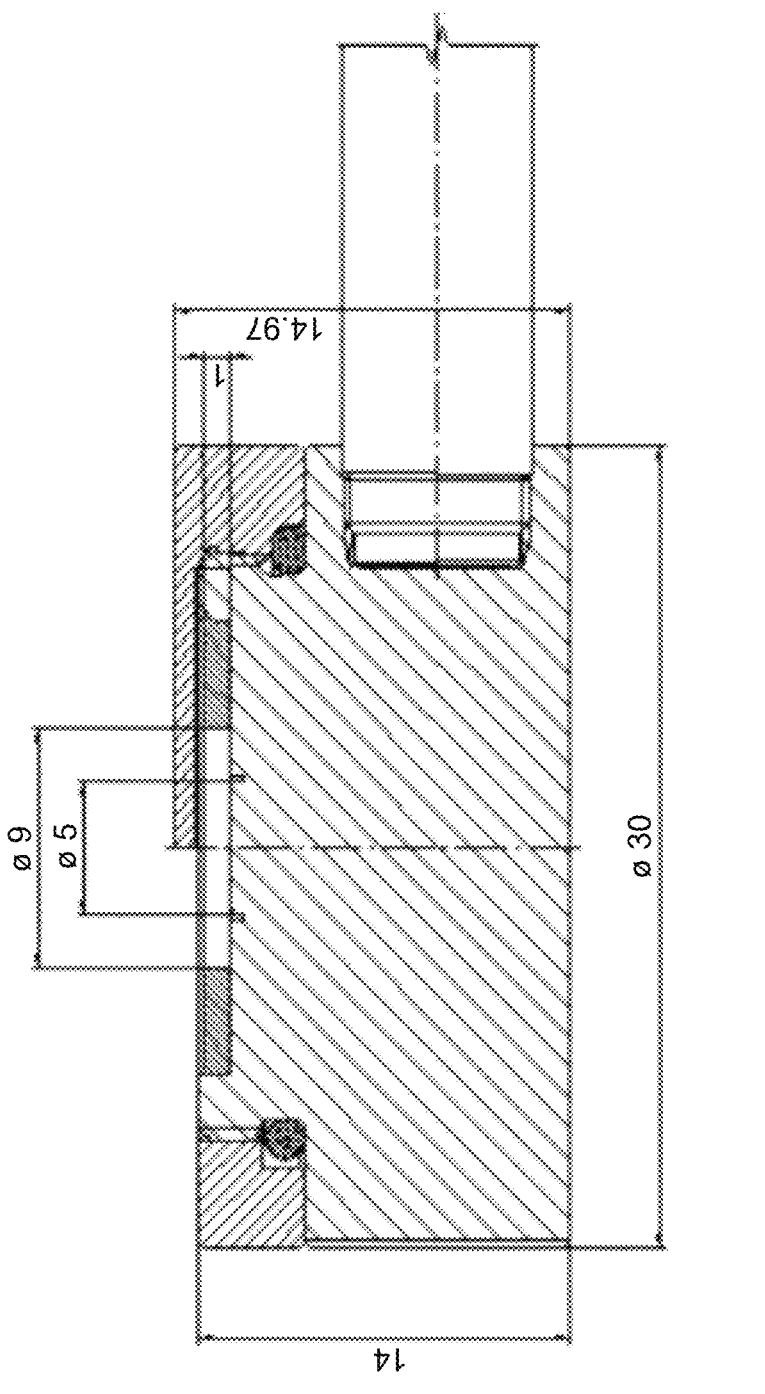
FIG. 7 is a cross-sectional view of an advanced Markus Chamber IC Type 34045 (PTW) used in one embodiment as a detecting part 3.

For the detecting part 3, an advanced Markus Chamber IC Type 34045 (PTW) may be used because of its wide guard ring design to avoid perturbation effects by reducing the influence of scattered radiation from the housing. As shown in FIG. 7, the Markus chamber has a narrow entrance window and a waterproof protection cap. Additionally, thanks to its small size, it may offer a high spatial resolution, making it a suitable choice for relative and absolute electron dosimetry. The measuring device is not limited to Markus Chamber or any other type of detector. Still, it is preferred to use a detector with a double ionization chamber.

Figure 8B:
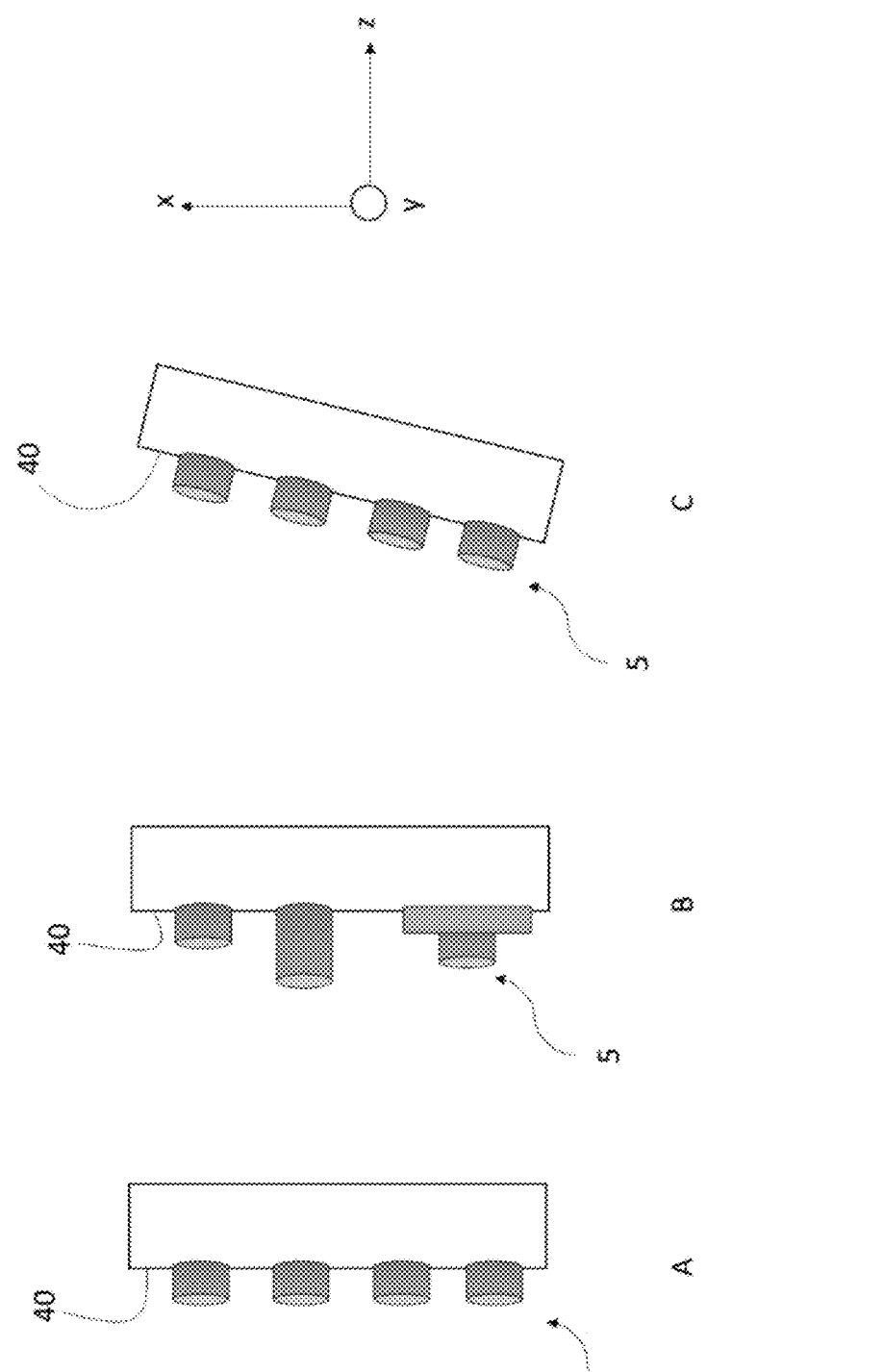
FIG. 8b is a side view of different embodiments of the wall where multiple detectors are positioned.

Referring to FIGS. 8*a* and 8*b*, the detectors 5 may be aligned side by side vertically (FIG. 8*a*.A, C, and D) or horizontally, coordinated or uncoordinated (FIG. 8*a*.B). Although the detectors 5 are placed in the plane 40, which may be horizontal, vertical or inclined (FIG. 8*b*.C), they may not be in the same plane. Detectors 5 with different heights, with support or without, may be used for the same series 1. Independently of the size, position, form, type, height, and alignment, the collimator 2 points the detector 5 to the specified target zone 30.

The gathered readings from the electrometer 6 are analyzed in-real time during the radiation or after the radiation of the product 10 by a control unit 80 to evaluate the quality of the process.

Figure 9:
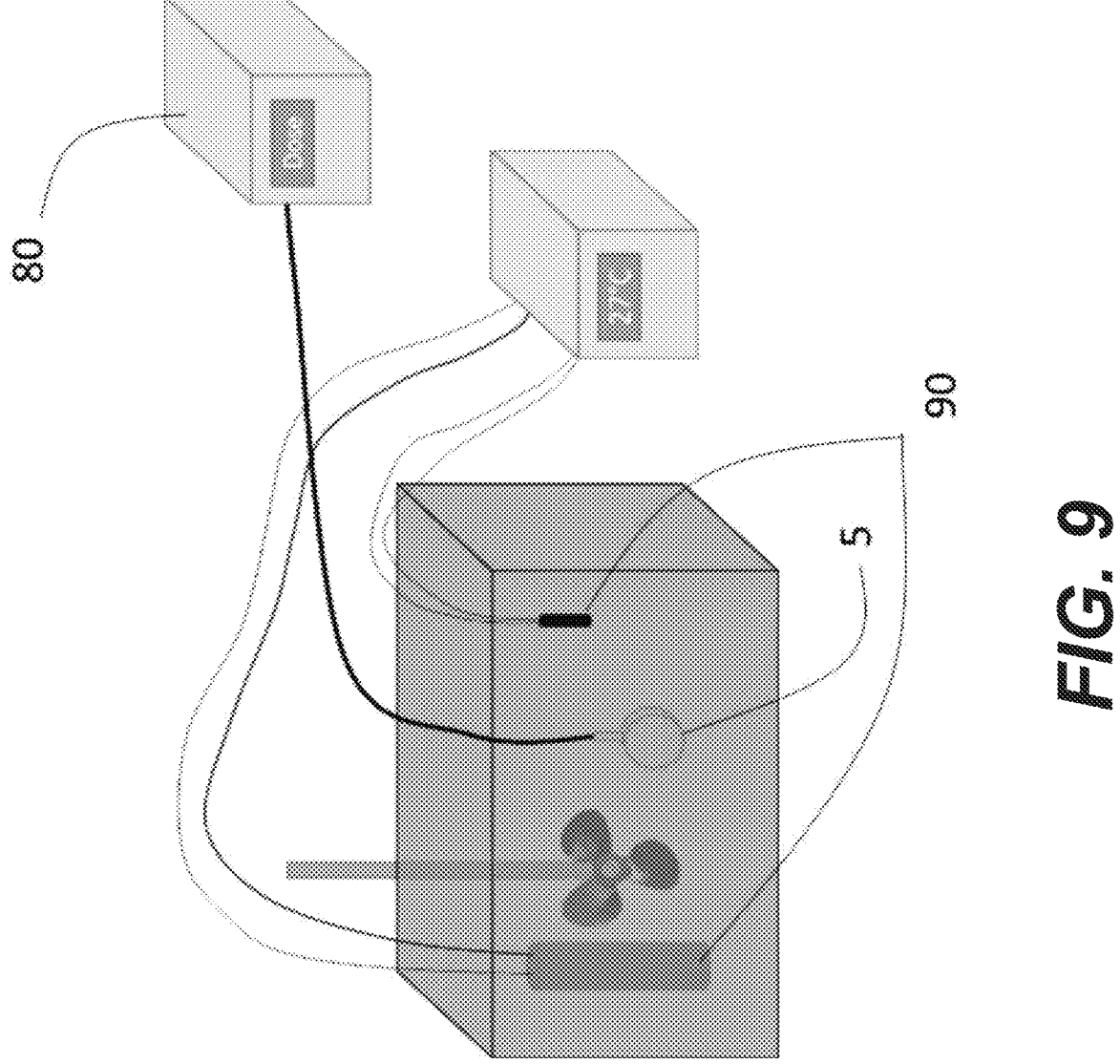
FIG. 9 is an illustration showing the setting up of the controller and the thermistors in relation to the detector.

With reference to FIG. 9, a controller 80 receives data from the detecting part 3, preferably a double ionization chamber, of each detector 5, and uses other data such as but not limited to conveyor speed, thermistors 90, beam parameters, and product parameters to determine the value of the absorbed irradiation dose by the product 10. More than one controller 80 may be used to receive the data of the multiple detectors 5 used in the measuring device. The measured data of the absorbed dose may be continuously recorded and compared to both the reference signal in the performance qualification and the signal recorded of each detector 5 from the same series 1, which points to the same target zone 30. When the deviation exceeds the defined threshold, a check of the signal of all the detectors 5 from the same series 1 is performed. For instance, if the recorded deviation is similar, it is most probable that the error originated from the radiation source 20. Whereas if the deviation is different, product 10 might cause the error.

Thermistors 90 are placed nearby each detector 5 to measure and track any temperature change. Preferably, more than one thermistor 90 are placed in different locations close the detectors 5, more preferably, three thermistors 90 are placed in dispersed positions toward each detector 5, one in the center, one behind, and one in the front of each detector 5. FIG. 7 illustrates one embodiment of the temperature control system. The measurements confirm the detectors' heating, leading to a current reduction as the air density reduces. Hence, a correction factor is needed based on the recorded temperature increase in all the positions where the thermistors 90 are installed. This correction related to the temperature change of the detectors 5 gives a more precise outcome permitting a reliable comparison.

Placing the detectors 5 behind the product 10 may help to reduce the measurement sensitivity due to the temperature increase as the intensity of the radiation reduces as they pass through the product 10 both due to loss of energy to the absorbed dose by the product 10 and due to the spreading out as distance from the radiation source 20 increases.

The collimator 2 of each of the at least a pair of detectors 5 points on the same point of the target zone 30. By comparing the signals of each detector 5 with the reference signal, it is possible to distinguish between an error coming from radiation source 20 and an error in the product 10. In more detail, in case of the measured signal is similar in both detectors 5, the error may most probably be triggered by an issue with the radiation source 20. Conversely, if the deviation is different between the detectors 5, the error may most probably be caused by the product 10.

The needed irradiation dose is calculated to define and provide the appropriate irradiation parameters such as the beam current and the conveyor speed. The apparatus may produce electrons from a range between 1 and 10 MeV. However, higher ranges are also possible if higher energy electrons are requested to deposit more energy in the product 10 and have more sterilization power or special polymer modification. Alternatively, lowering the conveying speed or exposing the product 10 longer in front of the irradiation souse 20 will also deposit more energy in the product 10. Furthermore, flipping the product 10 and/or applying multi passes can result in a reception of additional irradiation as the absorbed energy is cumulative.

An initial measurement of the signal of each detector 5 may be performed during the performance qualification of the product 10. During the irradiation process, the signal of the same detectors may also be recorded to allow a comparison of two ratios $$\frac{S_{d1,Process}(t)}{S_{d1,PQ}(t)} \text{ and } \frac{S_{d2,Process}(t)}{S_{d2,PQ}(t)}$$

where:

$S_{d1,PQ}(t)$ is the signal of the first detector 5, determined during the performance qualification of the product 10

$S_{d2,PQ}(t)$ is the signal of the second detector 5, determined during the performance qualification of the product 10

$S_{d1,Process}(t)$ is the signal of the first detector 5 during the processing of the product 10

$S_{d2,Process}(t)$ is the signal of the second detector 5 during the processing of the product 10.

Under normal operation and without any errors, both ratios $$\frac{S_{d1,Process}(t)}{S_{d1,PQ}(t)} \text{ and } \frac{S_{d2,Process}(t)}{S_{d2,PQ}(t)}$$

should be equal to 1. In case one of these ratios deviates from this value, the controller 80 analyses the ratio of all the detectors 5 employed and checks if the recorded deviation of one of the detectors 5 is similar or different to one or more of the other detectors 5 from the same series 1. Again, more than one series 1 with more than 2 detectors 5 in each, may be employed in the present disclosure. For example, suppose the deviation of the ratios of the detectors 5 that are pointing to the same target zone 30 are similar. In that case, the error comes from the radiation source 20 or the conveyor. Whereas, if the deviation is dissimilar, this may indicate that the error originates from the product 10.

The in-real-time measurement and comparison of the signal of ratios of detectors 5, may instantly reveal any out-of-the-range irradiation dose and guide the operator to determine the possible trigger or origin of any error or deviation based on data-driven to act accordingly, resulting in minimum quality control rejections. For example, and without any limitation, the out-of-tolerance of the beam current, the beam energy, the x-ray conversion, and the beam scanning amplitude are common beam errors to the person skilled in the art of the field of irradiation. Following the same principle, in case of different deviations between the ratios, $$\frac{S_{d1,Process}(t)}{S_{d1,PQ}(t)} \text{ and } \frac{S_{d2,Process}(t)}{S_{d2,PQ}(t)}$$

wrong product and/or wrong packaging, and/or wrong positioning of the product might most probably be one of the root causes. Furthermore, as the conveyor speed might influence the irradiated dose, it is also considered a parameter to verify in case of ratio deviation. The detector setup may also allow for other analyses, such as detecting any deviation over several product batches and/or over a long period. This allows the detection of slow drift of some irradiation parameters.

In a further embodiment, one reference signal of only one detector may be recorded and compared with the measured signals of the at least two detectors 5 of the same series 1 or more detectors from the same series 1.

In a further embodiment, one reference signal of only one detector may be recorded and compared with the measured signal of more than one detector from the same or different series 1.

In a further embodiment, more than one reference signal recorded by more than one detector during the performance qualification may be used for comparison with the signal recorded by more than one detector during the irradiation process.

In a further embodiment, the signal recorded during the irradiation of the product 10 may be compared with more than one reference signal recorded by the same detector or a different detector.

The use of the terms "compared" and "comparison" and "comparisons" and "comparing" and similar referents in the context of describing the present disclosure (especially in the context of the following claims) is to be considered to cover any way of examination in order to note similarities and differences.

Comparing signals is not limited to only comparing a ratio between a reference signal measured during the performance qualification of a reference product and a signal during the irradiation of the product 10. In more detail, the term "ratio" herein can be interpreted in any suitable way or method for comparing two or more signals. For example and without any limitation, subtracting the signals or using other mathematical calculations which lead to a comparison of two or more signals cover the scope of the present disclosure protection unless otherwise noted. Other comparison methods, such as visual, analytical, algorithmic or other methods for comparing two or more signals, are also included.

The detectors 5 may be sensitive to temperature change, especially when they are exposed to the beam. The detecting part 3 of each detector 5, which might be, for example, an ionization chamber, preferably a double ionization chamber, will progressively heat up. The more the temperature rises, the lower the air density, hence the lower the collected current. The sensitivity of the detectors 5 used in real-time measuring depends on temperature. Thus, a correction factor should be applied to the recorded signal to eliminate any effect of temperature changes during the performance qualification, the running in, and the operation of the irradiation apparatus. Alternatively, a cooling system may be used to maintain a stable temperature of the detectors 5. Otherwise, ventilating the ionization chamber with a temperature-controlled gas may dismiss the need for any temperature correction.

Figure 10A:
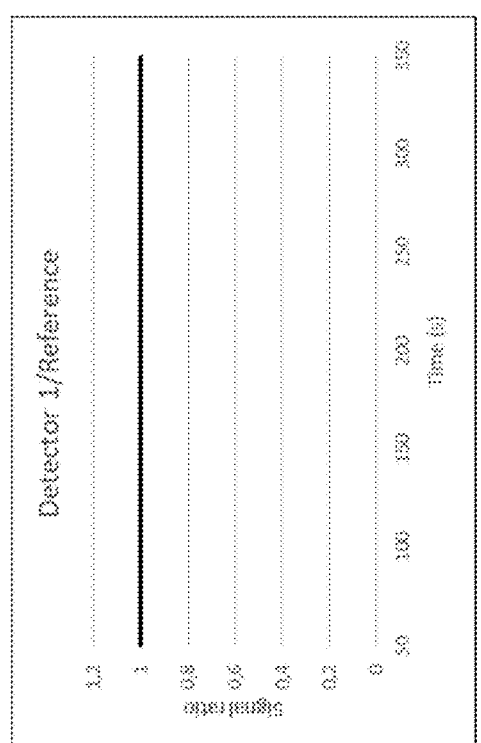
FIG. 10a is a standard example of signal comparison between a reference signal recorded during the performance qualification with a reference product by a detector and two signals of two detectors during the radiation process of the product, as well as the ratio of each signal of each detector and the reference signal when no error is detected.
Figure 10A:
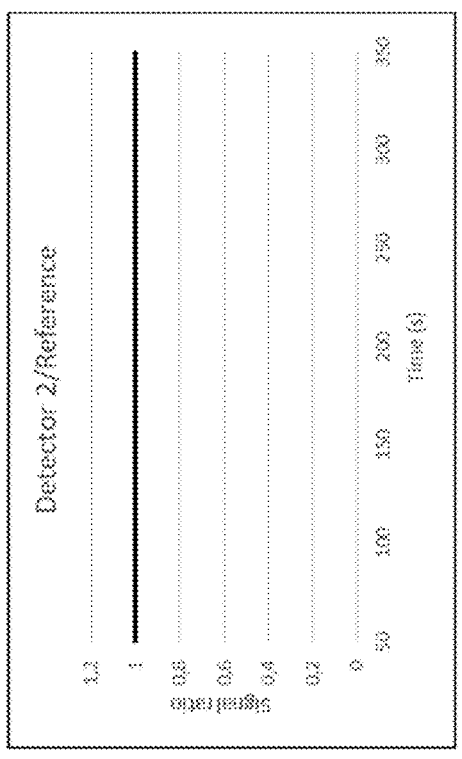
Figure 10A:
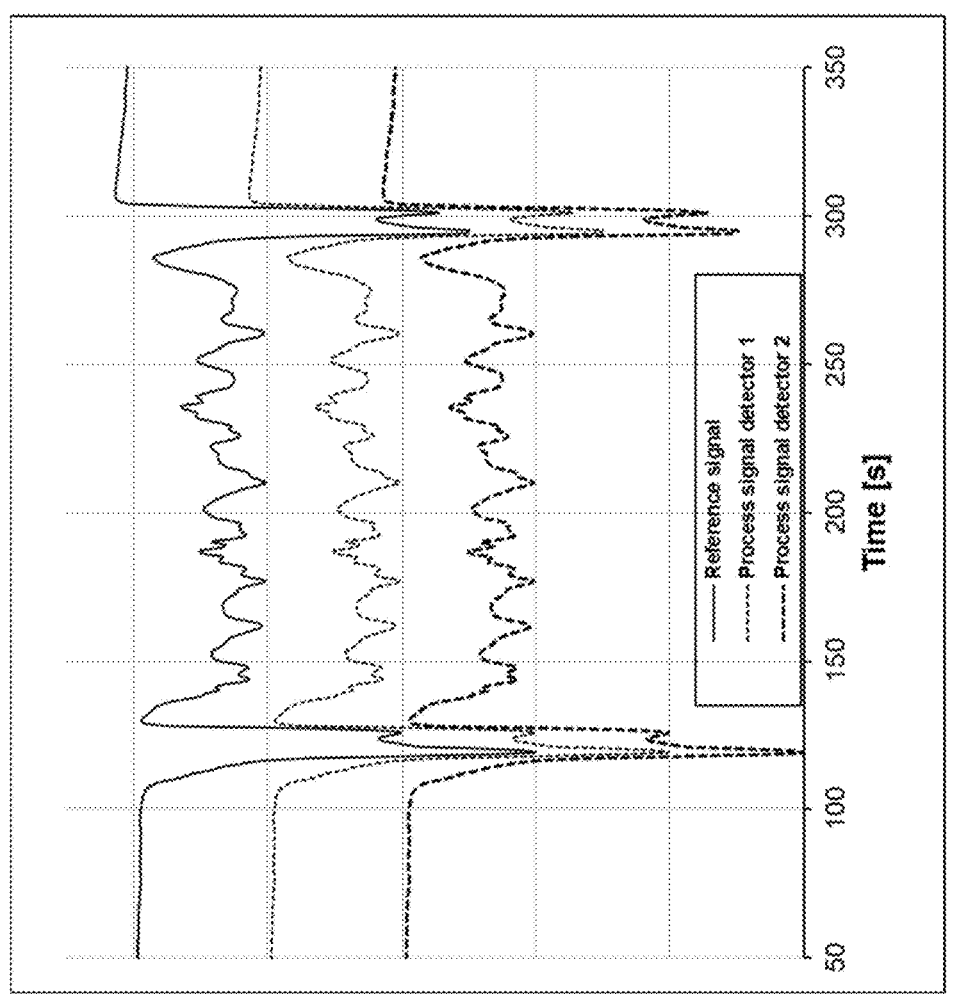
Figure 10B:
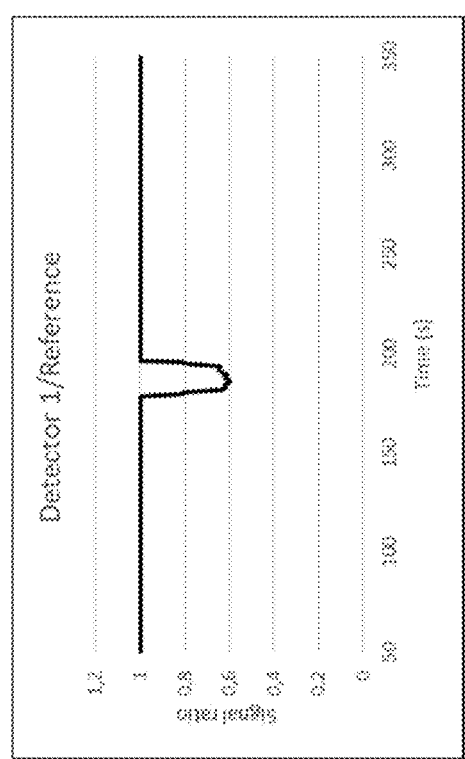
FIG. 10b is a standard example of signal comparison between a reference signal recorded during the performance qualification with a reference product by a detector and two signals of two detectors during the radiation process of the product, as well as the ratio of each signal of each detector and the reference signal when a wrong product is locally loaded on the pallet.
Figure 10B:
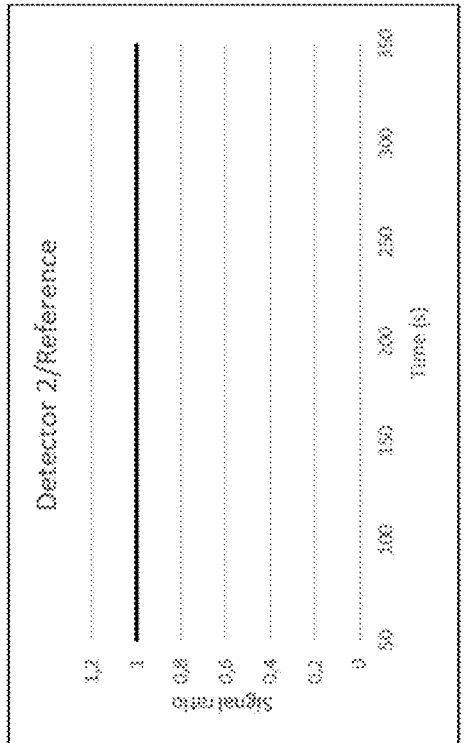
Figure 10B:
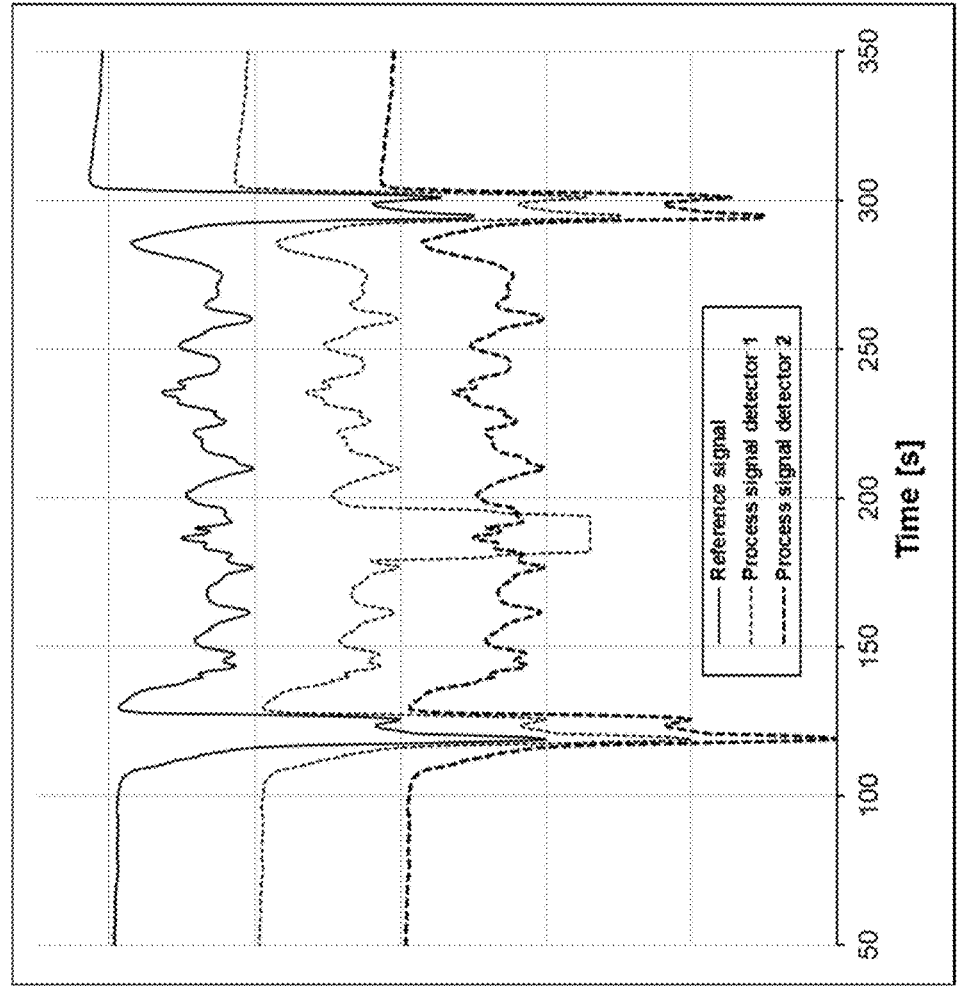
Figure 10C:
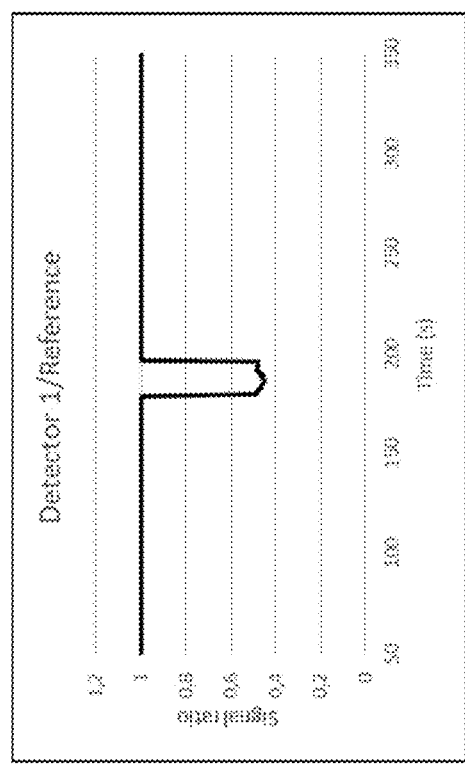
FIG. 10c is a standard example of signal comparison between a reference signal recorded during the performance qualification with a reference product by a detector and two signals of two detectors during the radiation process of the product, as well as the ratio of each signal of each detector and the reference signal when a momentaneous problem of the radiation occurred.
Figure 10C:
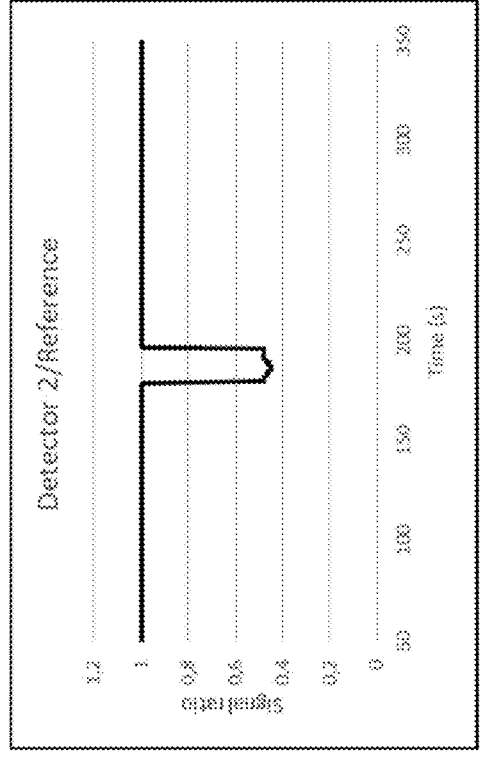
Figure 10C:
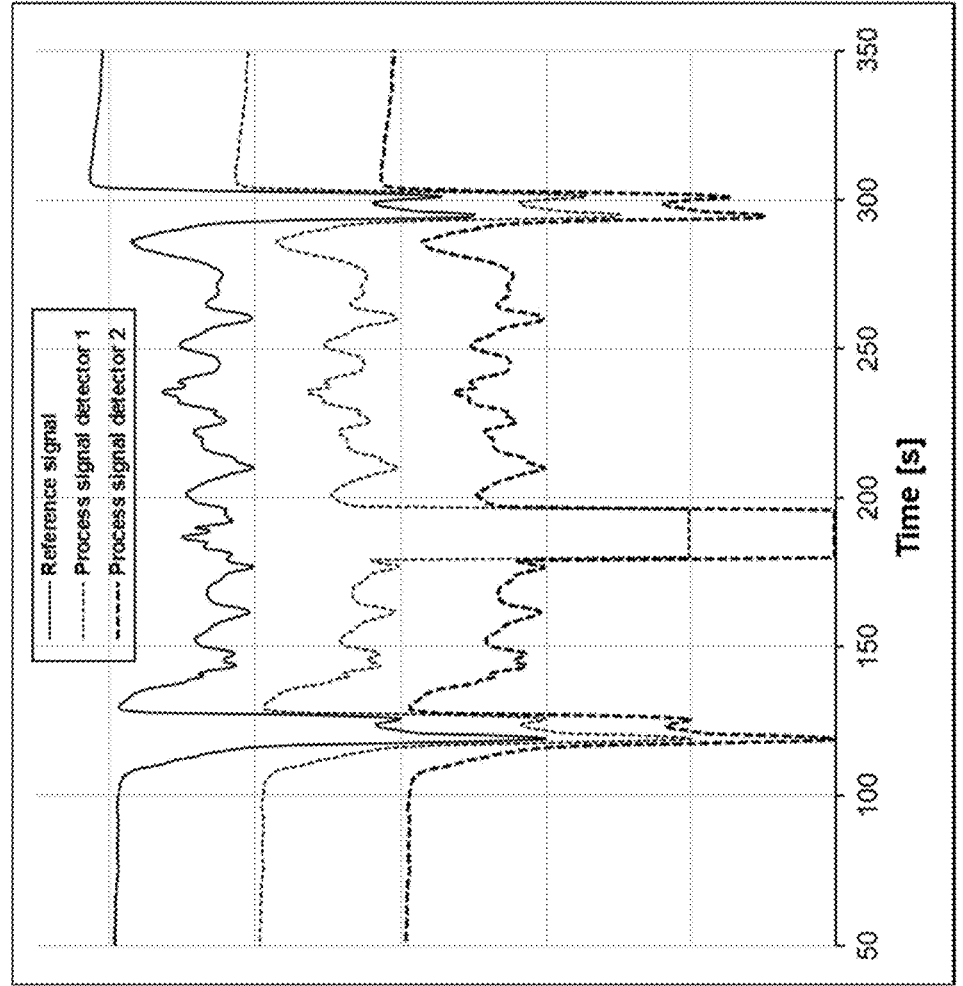

FIGS. 10a, 10b and 10c illustrate an example of three scenarios measurements; correct irradiation, wrong product locally loaded on the pallet, and momentaneous problem in radiation delivery accordingly. In the case of correct irradiation (FIG. 10a), the two recorded signals of the two detectors from the same series 1 are similar and correspond with the reference signal recorded by one of the same detectors 5 during the performance qualification with a reference product that has the same properties and characteristics of the product 10 used during the radiation process. In practice, the product 10 may be a pallet loaded with a uniform number of units of the same product. The reference signal is obtained using a reference pallet with the same number and structure of units of reference products that have the same properties and characteristics as the products which need to be irradiated by the radiation apparatus. A reference signal recorded by a detector different from the detectors used for measuring the radiation dose during the irradiation of the product 10 may also be employed for the comparison. The three curves are put side by side for better visualization. In principle, the curves have a constant signal at the two ends sides, and an oscillation starts to appear when the reference product or product 10 passes in front of the converter 31 or the radiation zone. The middle zone of each curve represents the signal during the radiation of the product 10 or the reference product. The ratio of each detector signal with the reference signal illustrated on the top right and down left of FIG. 10a should be close to 1 when there is no error in either the product or the radiation. However, if one ratio deviates from 1 (FIG. 10b), an issue related to the irradiated product 10 is likely the origin of this deviation. In the way of example and without any limitation, a wrong product is locally loaded on the pallet, improper packaging is used, or the product is wrongly positioned. In contrast, the problem originated from the radiation source if the ratio deviation appears in both detectors (FIG. 10c). It is good to mention, that for the purpose of general presentation, only one reference signal is presented to FIGS. 10a, 10b and 10c.

Figure 11A:
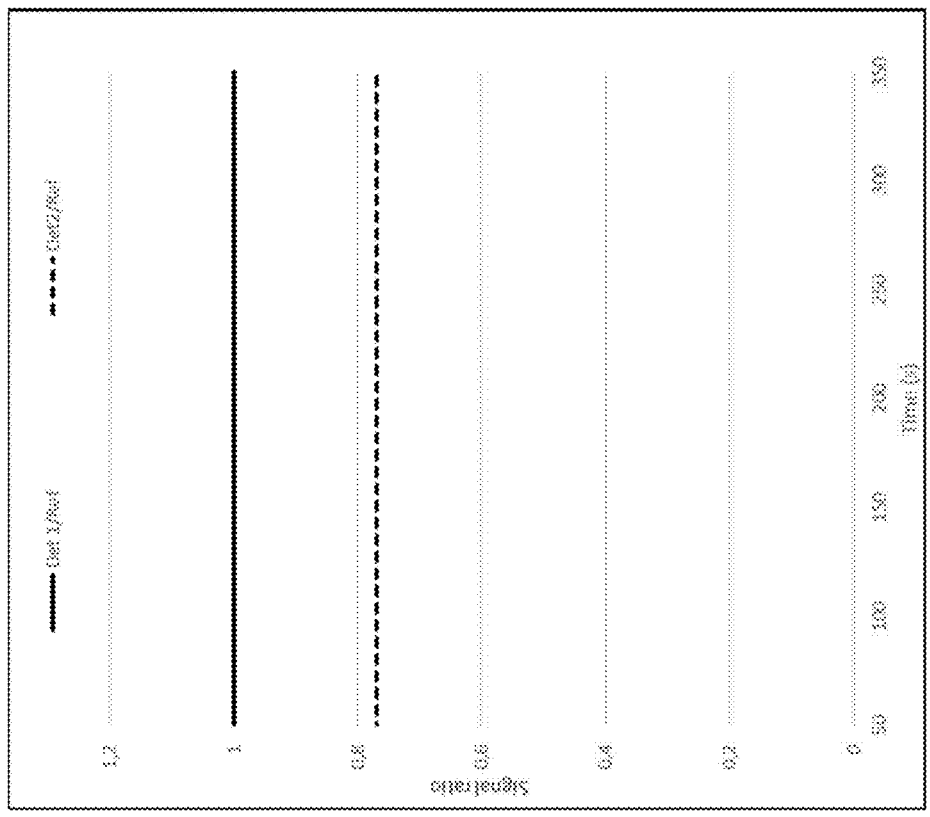
FIG. 11a is an example of signal comparison between one reference signal recorded during the performance qualification with a reference product by the detector 1 and the two signals of detector 1 and 2 during the radiation process of the product, as well as the ratio of each signal of detector 1 and 2 and the reference signal of detector 1 when no error is detected.
Figure 11A:
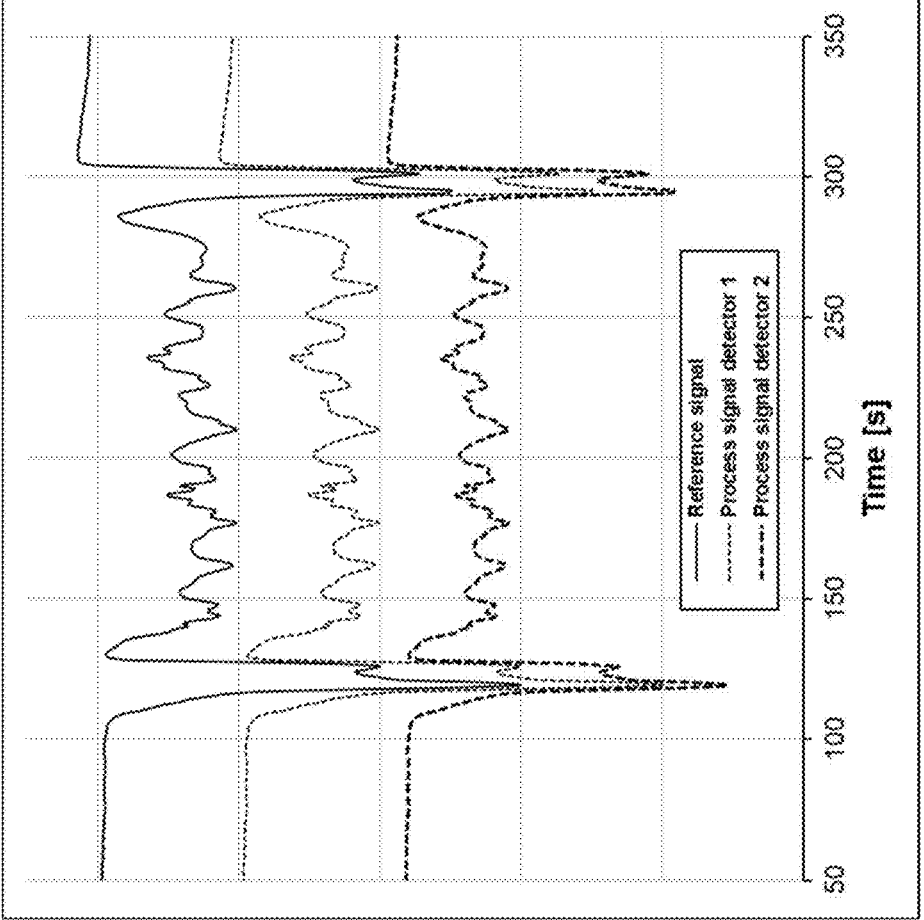
Figure 11B:
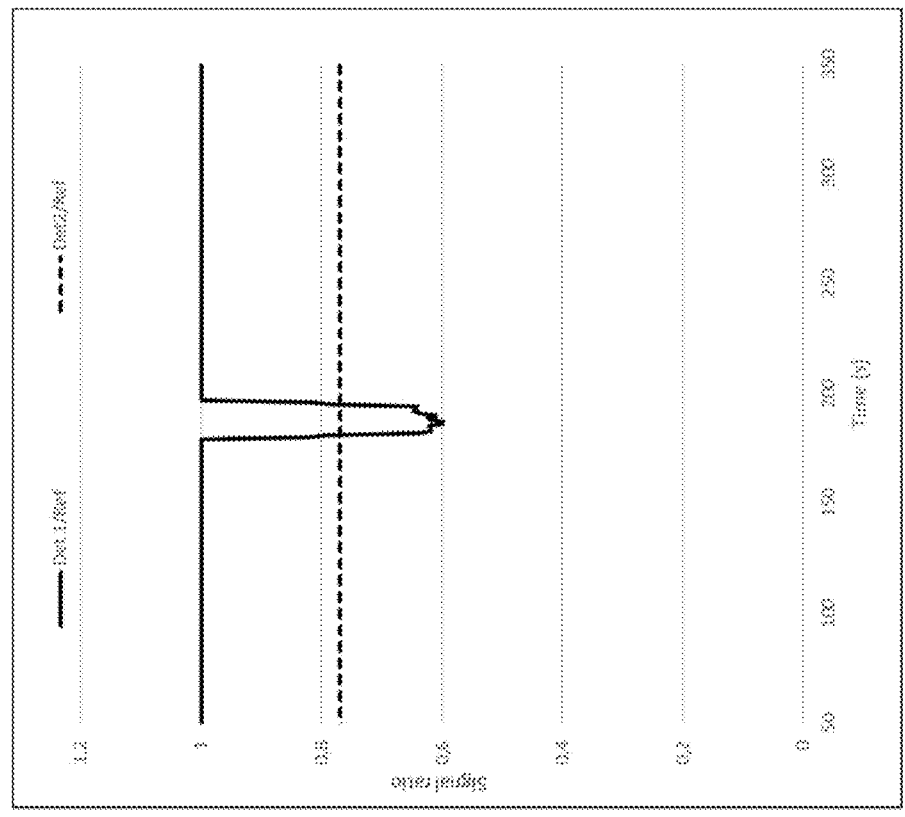
FIG. 11b is an example of signal comparison between one reference signal recorded during the performance qualification with a reference product by the detector 1 and the two signals of detector 1 and 2 during the radiation process of the product, as well as the ratio of each signal of detector 1 and 2 and the reference signal of detector 1 when a wrong product is locally loaded on the pallet.
Figure 11B:
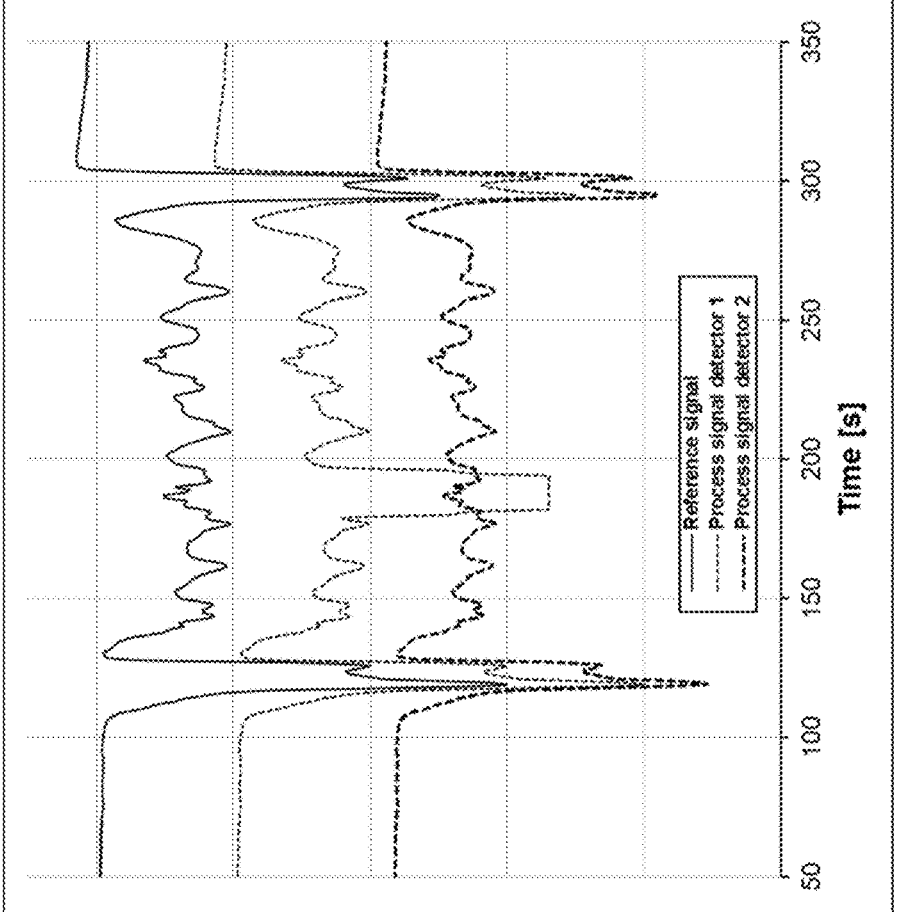
Figure 11C:
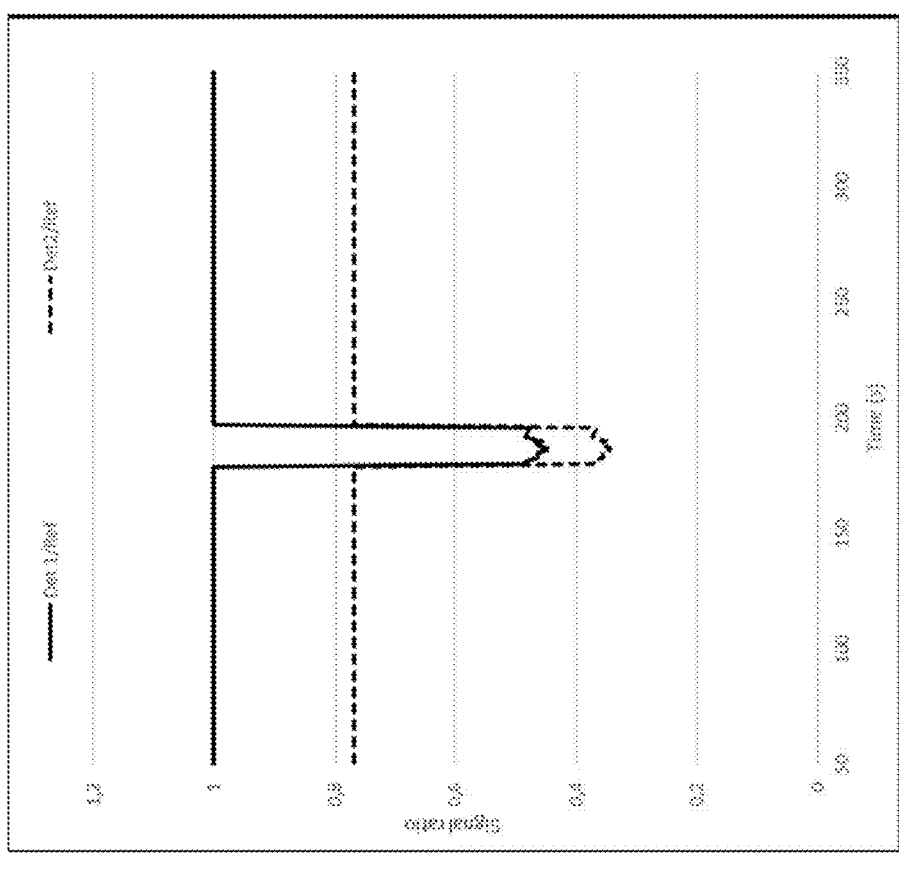
FIG. 11c is an example of signal comparison between one reference signal recorded during the performance qualification with a reference product by the detector 1 and the two signals of detector 1 and 2 during the radiation process of the product, as well as the ratio of each signal of detector 1 and 2 and the reference signal of detector 1 when a momentaneous problem of the radiation occurred.
Figure 11C:
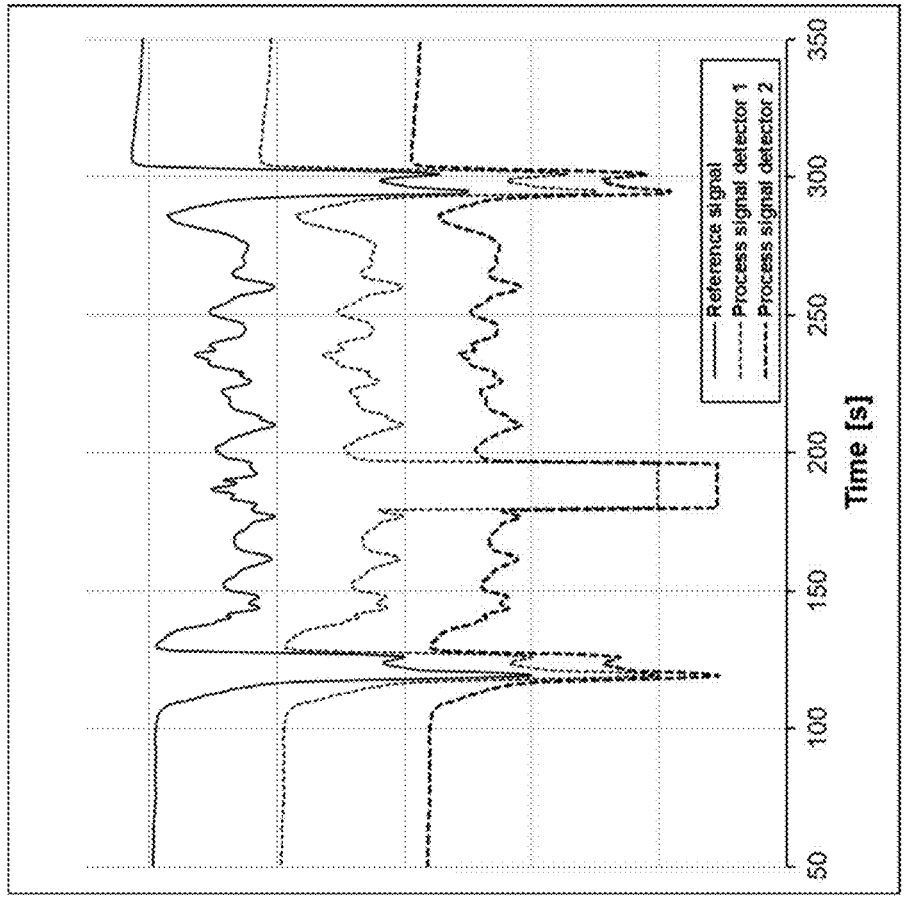

FIGS. 11a, 11b and 11c illustrate an example of three scenarios measurements; irradiation with no error, wrong product locally loaded on the pallet, and momentaneous problem in radiation delivery accordingly. In the case of correct irradiation (FIG. 11a), the two recorded signals of the two detectors 5 from the same or different series 1 show a similar trend as the trend of the reference signal confirming the radiation of the right product with the required radiation. The right part of FIG. 11a shows two lines; one represents the ratio of the signal of the first detector with the reference signal, and another represents the ratio of the signal of the second detector with the same reference signal. In this embodiment, only one reference signal is measured by one of the two detectors 5 and employed to be compared with the measured signal of the said two detectors 5. When the same detector is utilized for both the reference signal and the measured signal during the radiation process, the ratio value may equal a value close to 1 in case no error occurs. In contrast, the ratio remains almost constant with a value lower or higher than 1 when the detector used during the radiation process is different from the detector used to measure the reference signal during the performance qualification. The different positions of the detector used to record the reference signal, and the detector used during the radiation process may be the origin of this signal shift. The radiation beam is collected from a different portion of the product 10 and may be absorbed differently by the product 10. In other words, the beam detected by the detectors is different depending on the depth of the product traversed. FIGS. 11b and 11c illustrate a scenario of a product wrongly loaded on the pallet and a radiation wrongly delivered accordingly. When the pallet 10 is loaded with multiple similar products, the trend and fluctuation of the curve represented by the measured signal should be similar to the trend and fluctuation of the curve of the reference signal. In case of an error, the deviation of only one detector (FIG. 11b) or of the two detectors (FIG. 11c) will be prominent and easily detectable.

Figure 12A:
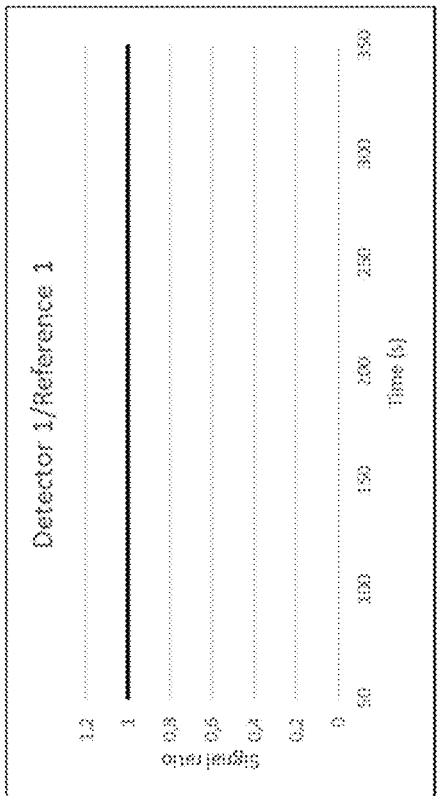
FIG. 12a is an example of signal comparison between two reference signals recorded during the performance qualification with a reference product by the detector 1 and 2 and the two signals of detector 1 and 2 during the radiation process of the product, as well as the ratio of each signal of detector 1 and 2 and the reference signals of detector 1 and 2 when no error is detected.
Figure 12A:
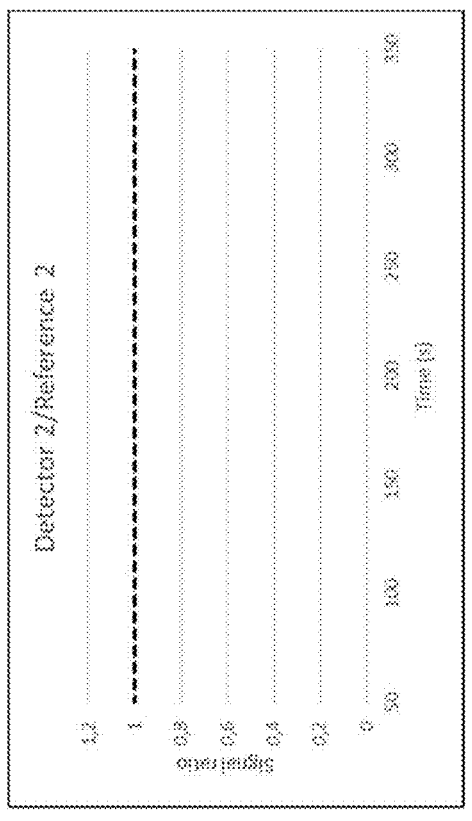
Figure 12A:
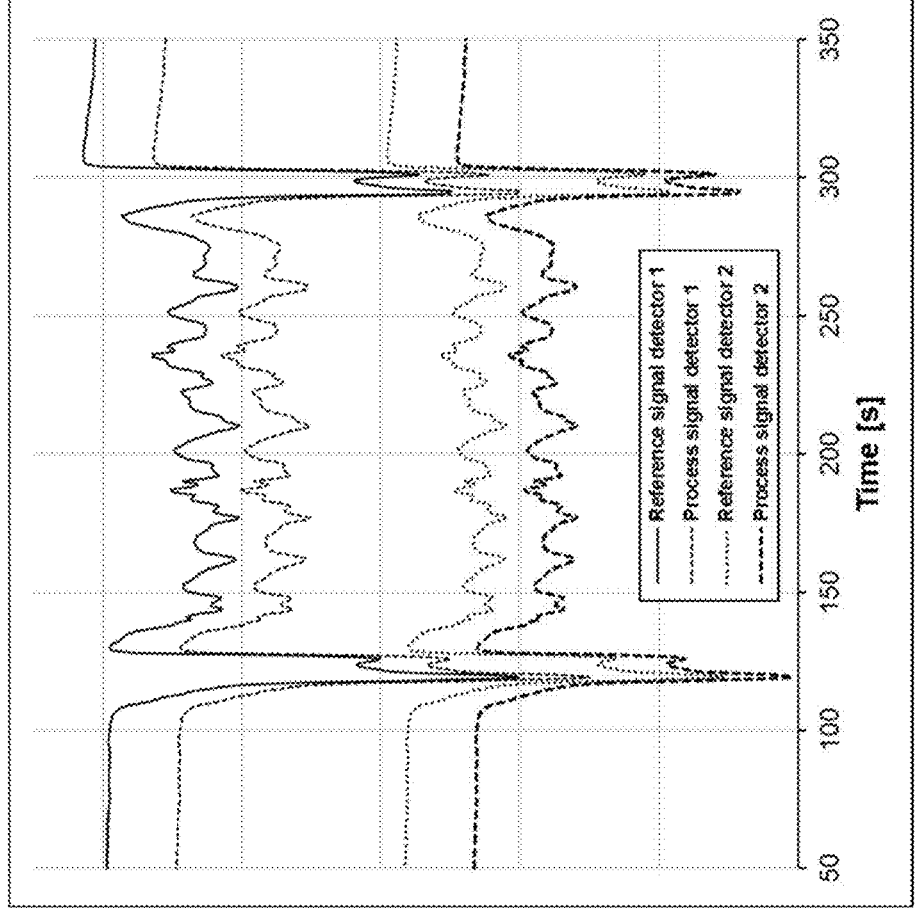
Figure 12B:
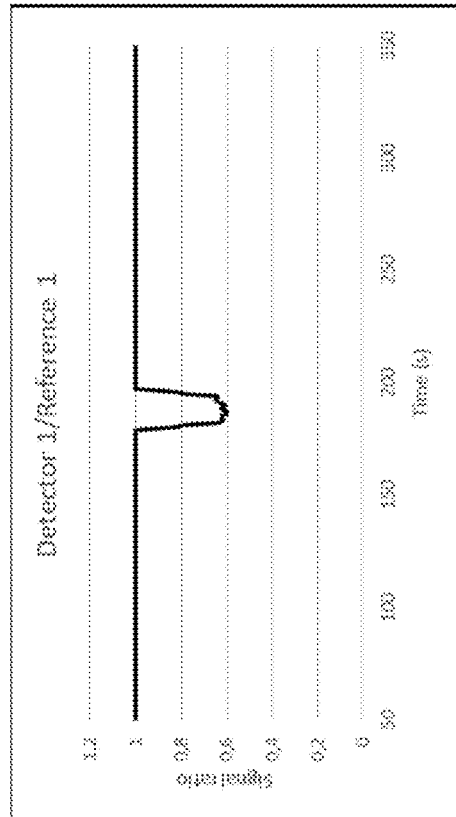
FIG. 12b is an example of signal comparison between two reference signals recorded during the performance qualification with a reference product by the detector 1 and 2 and the two signals of detector 1 and 2 during the radiation process of the product, as well as the ratio of each signal of detector 1 and 2 and the reference signals of detector 1 and 2 when a wrong product is locally loaded on the pallet.
Figure 12B:
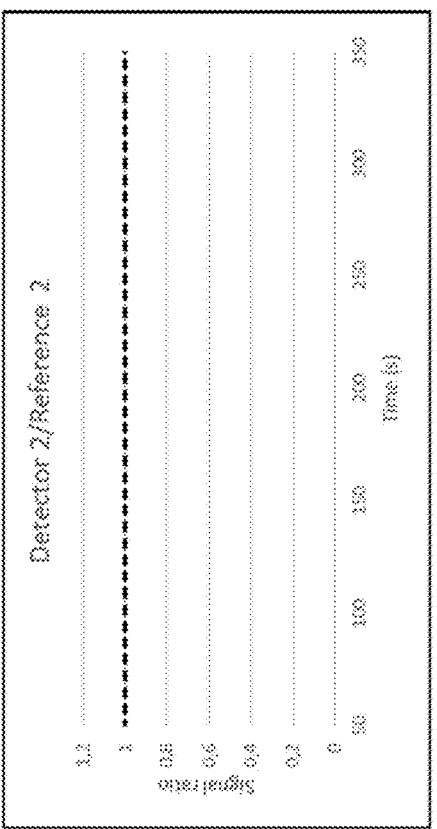
Figure 12B:
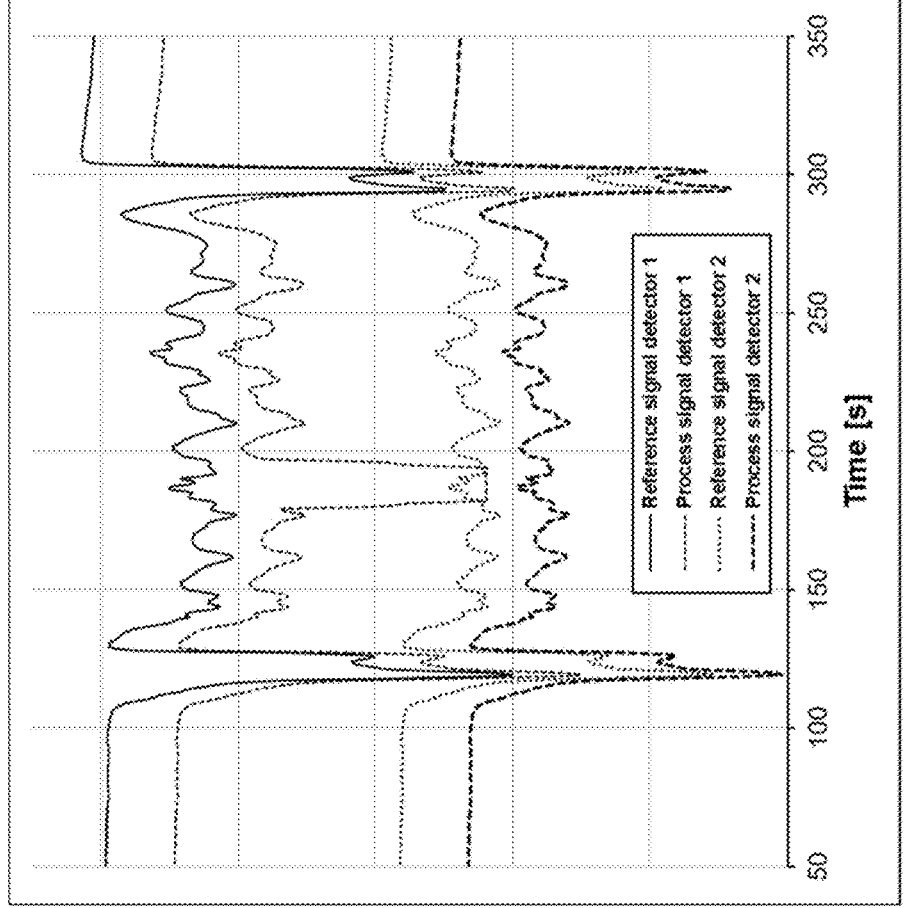
Figure 12C:
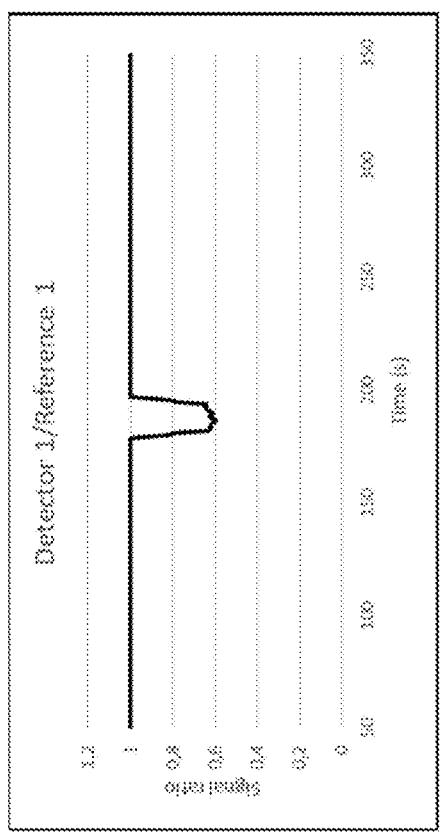
FIG. 12c is an example of signal comparison between two reference signals recorded during the performance qualification with a reference product by the detector 1 and 2 and the two signals of detector 1 and 2 during the radiation process of the product, as well as the ratio of each signal of detector 1 and 2 and the reference signals of detector 1 and 2 when a momentaneous problem of the radiation occurred.
Figure 12C:
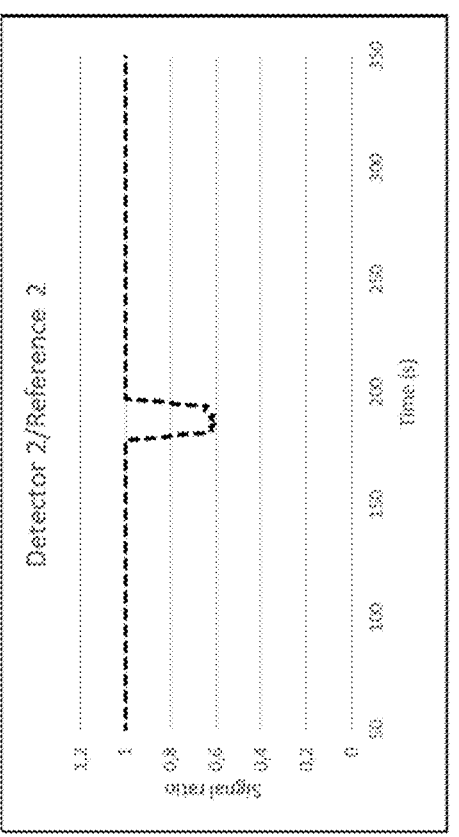
Figure 12C:
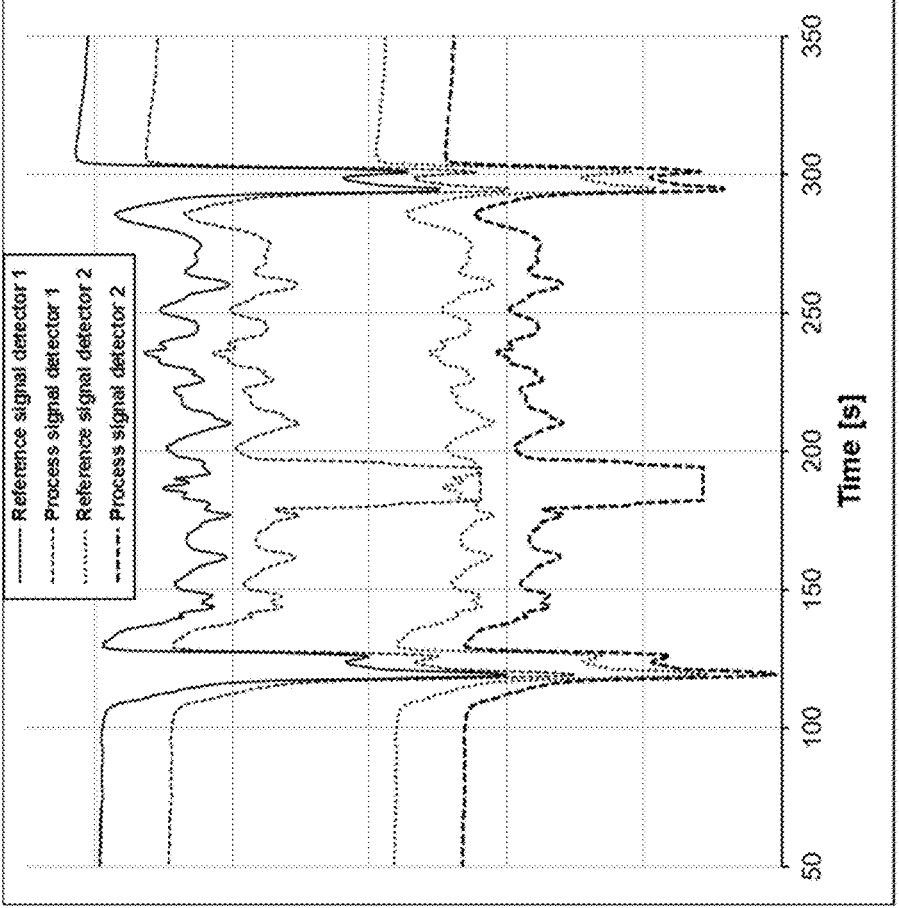

Referring to FIGS. 12a, 12b and 12c, the same logic is applied except that the same detector is used to measure the reference signal as well as the absorbed signal by the product 10 during the radiation process.

The use of the terms "a" and "an" and "the" and similar referents in the context of describing the present disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the present disclosure and does not pose a limitation on the scope of the present disclosure unless otherwise claimed. No language in the specification should be construed as indicating any non-claimed element as essential to the practice of the present disclosure.

Preferred embodiments of this present disclosure are described herein, including the best mode known to the inventors for carrying out the present disclosure. Variations of those preferred embodiments may become apparent to those of ordinary skill in the art upon reading the foregoing description. The inventors expect skilled artisans to employ such variations as appropriate, and the inventors intend for the present disclosure to be practiced otherwise than as specifically described herein. Accordingly, this present disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

The invention claimed is:

1. A method for checking the radiation dose received by a product by a radiation source comprising the following steps;

measuring at least a reference signal $S_{dn,PQ}(t)$ of the radiation dose by at least one detector of a series of at least two detectors during a performance qualification step received by a reference product, said series of at least two detectors comprising each a detecting part and a collimator placed at a predetermined distance from the radiation source in such a way that the said at least two detectors are arranged in a plane facing a converter generating the irradiation beam and pointing to a same target zone of the radiation source that is interrupted partially or fully by at least a portion of the product, conveying the product in front of the radiation source so that at least a portion of a front surface of the product is irradiated with an irradiation beam produced from said radiation source, measuring a signal $S_{dn,Process}$(t) of the radiation dose received by said product by each detector of the series of the least two detectors, and comparing each measured signal of the at least two detectors of the same series with the at least reference signal measured by the at least one detector by a controller.

2. The method according to claim 1, wherein by comparing at least two ratios $$\frac{S_{dn,Process}(t)}{S_{dn,PQ}(t)}$$

of the at least two detectors of the same series, it is determined whether the error is coming from the product or the radiation source.

3. The method according to claim 2, wherein a similar deviation between the at least two ratios $$\frac{S_{dn,Process}(t)}{S_{dn,PQ}(t)}$$

of the at least two detectors of the same series indicates a possible error coming from the radiation source.

4. The method according to claim 2, wherein a different deviation between the at least two ratios $$\frac{S_{dn,Process}(t)}{S_{dn,PQ}(t)}$$

of the at least two detectors of the same series indicates a possible error coming from the product.

5. The method according to claim 1, wherein at least one reference signal $S_{dn,PQ}$(t) is measured by each detector of the same series.

6. The method according to claim 1, wherein the product is placed in between the converter and the series of at least two detectors interrupting the radiation source radiating between the target zone and the series of at least two detectors.

7. The method according to claim 1, wherein the collimator is covering partially or fully the detecting part and facing the converter intended to narrow the reception of the radiation from the target zone in order to capture the radiation dose.

8. The method according to claim 1, wherein each detector is equipped with an electrometer used to read and capture the radiation dose in real-time at a frequency between 0.1 Hz and 10 KHz, preferably around 1 Hz.

9. The method according to claim 8, wherein the detecting part of each of the at least two detectors is an ionization chamber, preferably a double ionization chamber connected to the electrometer.

10. The method according to claim 8, wherein the signal of each detecting part read by the electrometer during the radiation of the product $S_{dn,Process}$(t) is ratioed with the reference signal $S_{dn,PQ}$(t) of the same detecting part during the performance qualification step of the product so that the ratio $$\frac{S_{d1,Process}(t)}{S_{d1,PQ}(t)}$$

of first detector is compared in real-time by the controller with the ratio $$\frac{S_{d2,Process}(t)}{S_{d2,PQ}(t)}$$

of at least another detector from the same series of at least two detectors.

11. The method according to claim 1, wherein the reference product used in the performance qualification has the same properties, characteristics, features, material, and structure as the product.

12. An apparatus for the irradiation of a product using the method according to claim 1, comprising;

a radiation source to provide radiation beams that pass through at least a portion of a front surface of the irradiated product, a series of at least two detectors comprising each a detecting part and a collimator placed at a predetermined distance from the radiation source in such a way that the at least two detectors are arranged in a plane facing the radiation source and pointing to a same target zone of the radiation source that is interrupted partially or fully by at least a portion of the product, a controller to make comparison between at least one signal recorded from one of the at least two detectors during the performance qualification $S_{dn,PQ}$(t) and signals recorded from the same at least two detectors during the irradiation of the product $S_{dn,Process}$(t), and a conveying device which conveys the product in front of the radiation source and between said radiation source and the series of the at least two detectors.

13. The apparatus according to claim 12, wherein by comparing the at least two ratios $$\frac{S_{dn,Process}(t)}{S_{dn,PQ}(t)}$$

of the at least two detectors of the same series, it is determined whether the error is coming from the product or the radiation source.

14. A measuring device for measuring a radiation dose of a radiation beam used for the method according to claim 1, comprising a series of at least two detectors comprising each;

a detecting part which is equipped with an ionization chamber, preferably a double ionization chamber, a collimator covering partially or fully the detecting part intended to narrow the reception of a beam, an electrometer used to capture and read a radiation dose in real-time at a frequency between 0.1 Hz and 10 KHz, preferably around 1 Hz, wherein the collimator of one of the at least two detectors is pointing to a same target area of a beam of another collimator of another detector of the at least two detectors.

15. The radiation measuring device according to claim 14, wherein the collimator of each of the at least two detectors is covering partially or fully the detecting part that is attached in the plane.

16. The radiation measuring device according to claim 14, wherein the plane is spaced from the target area of a radiation source by a space intended for the passage of at least a portion of the product.

\* \* \* \* \*